(12) United States Patent
Clark et al.

(10) Patent No.: US 11,983,212 B2
(45) Date of Patent: *May 14, 2024

(54) ARTIFICIALLY INTELLIGENT SYSTEM EMPLOYING MODULARIZED AND TAXONOMY-BASED CLASSIFICATIONS TO GENERATE AND PREDICT COMPLIANCE-RELATED CONTENT

(71) Applicant: Ascent Technologies, Inc., Chicago, IL (US)

(72) Inventors: Brian T. Clark, Chicago, IL (US); Chris Doyle, Chicago, IL (US)

(73) Assignee: Ascent Technologies Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,207

(22) Filed: Dec. 22, 2022

(65) Prior Publication Data

US 2023/0126681 A1    Apr. 27, 2023

Related U.S. Application Data

(63) Continuation of application No. 16/605,433, filed as application No. PCT/US2018/028168 on Apr. 18, 2018, now Pat. No. 11,537,649.
(Continued)

(51) Int. Cl.
*G06F 16/35* (2019.01)
*G06F 16/2457* (2019.01)
(Continued)

(52) U.S. Cl.
CPC ...... *G06F 16/353* (2019.01); *G06F 16/24578* (2019.01); *G06F 16/285* (2019.01);
(Continued)

(58) Field of Classification Search
CPC ............... G06F 16/353; G06F 16/285; G06F 16/24578; G06F 40/285; G06F 40/205;
(Continued)

(56) References Cited

U.S. PATENT DOCUMENTS

2012/0011118 A1  1/2012  Gleicher et al.
2012/0221485 A1  8/2012  Leidner et al.
(Continued)

OTHER PUBLICATIONS

Ascent Technologies, Inc., International Search Report and Written Opinion, PCT/US2018/028168, dated Jun. 27, 2018, 6 pgs.
(Continued)

*Primary Examiner* — Hosain T Alam
*Assistant Examiner* — Nicholas E Allen
(74) *Attorney, Agent, or Firm* — Morgan, Lewis & Bockius LLP

(57) ABSTRACT

An artificially intelligent system for generating compliance-related content, the system includes monitoring circuitry that receives regulatory compliance data from published regulatory texts; a taxonomy engine that generates taxonomy-based classifications of the regulatory compliance data, the taxonomy-based classifications having a plurality of modules and compliance requirements within each module. The system includes databases storing the taxonomy-based classifications of the regulatory compliance data; a processor that receives at least two of the plurality of modules from the taxonomy-based classifications and processes the compliance requirements within each received module using one or more artificially intelligent processes by mapping semantic relationship pairs between received modules; and scoring circuitry that: (1) produces a respective similarity score for one or more mapped semantic relationship pairs between received modules; and (2) uses the one or more respective similarity scores to generate a set of compliance steps
(Continued)

covering compliance requirements from each of the received modules.

15 Claims, 17 Drawing Sheets

Related U.S. Application Data

(60) Provisional application No. 62/487,181, filed on Apr. 19, 2017.

(51) Int. Cl.
    *G06F 16/28*     (2019.01)
    *G06F 40/205*     (2020.01)
    *G06F 40/30*     (2020.01)
    *G06N 20/00*     (2019.01)
    *G06Q 10/0639*     (2023.01)

(52) U.S. Cl.
    CPC ............ *G06F 40/205* (2020.01); *G06F 40/30* (2020.01); *G06N 20/00* (2019.01); *G06Q 10/06393* (2013.01)

(58) Field of Classification Search
    CPC ... G06F 40/30; G06N 20/00; G06Q 10/06393
    USPC .......................................................... 707/737
    See application file for complete search history.

(56) References Cited

U.S. PATENT DOCUMENTS

| | | | |
|---|---|---|---|
| 2012/0296845 A1 | 11/2012 | Andrews et al. | |
| 2015/0142682 A1* | 5/2015 | Ghaisas | G06Q 30/018 705/317 |
| 2015/0193708 A1* | 7/2015 | Reddington | G06Q 10/0637 705/7.36 |
| 2016/0203494 A1* | 7/2016 | Galligan Davila | G06Q 30/018 705/317 |
| 2016/0239766 A1* | 8/2016 | Cameron | G06F 3/04847 |
| 2016/0350765 A1* | 12/2016 | Clark | G06Q 50/26 |
| 2016/0350885 A1 | 12/2016 | Clark | |

OTHER PUBLICATIONS

Ascent Technologies, Inc., International Preliminary Report on Patentability, PCT/US2018/028168, dated Oct. 22, 2019, 5 pgs.

Clark, Office Action, U.S. Appl. No. 16/605,433, dated Feb. 15, 2022, 28 pgs.

Clark, Notice of Allowance U.S. Appl. No. 16/605,433, dated Aug. 23, 2022, 7 pgs.

Jeremy C. Maxwell; Annie I. Anton; Peter Swire; "Managing changing compliance requirements by predicting regulatory evolution," Nov. 12, 2012, IEEE, https://ieeexplore.ieee.org/stannp/stannp_jsp?tp=&arnumber=6345793 (Year: 2012).

* cited by examiner

UserName ▾

- ◎ Dashboard
- ⊞ User Guide
- ▣ Accounts
- ▤ Corporations — 909
- ◎ Navigator
- ⚭ ModBuilder
- ▨ References — 910
- ⊠ Tasks
- △ Issues — 912
- ▤ Reports
- ▦ Compliance Manual Account: | AccountName ▾ | — 913   Corporation: | CompanyName ▾ | — 914   ◎ UserName

CompanyName's Tasks To Do

Tasks (Showing 0-20 of 478 tasks) Next tasks — 902    903    Search your tasks | Search | Clear |

| Regulator | RAI | Rule(s) | Tasks | Stage | Notes | Due Date | Assigned to |
|---|---|---|---|---|---|---|---|
| NFA 901 ◻△▢ | 6 — 908 | NFA Compliance Rule 2-38, NFA Interpretive Notice #9052 | Ensure a supervisory individual reviewed the Business Community and Disaster Recovery (BC/DR) plan and signed off that review | Open ▾ | The manager on Duty has reviewed the required BC/DR Plan | 2016-02-15 | UserName ▾ |
| NFA 911 ◻△▢ | 6 | NFA Compliance Rule 2-38, NFA Interpretive Notice #9052 | Ensure the firm updates its Business Continuity and Disaster Recovery (BC/DR) plan as necessary to respond to material changes in the Member's operations | Open ▾ | | 2016-02-15 | UserName ▾ |

FIG. 9

| UserName ▾ | Account: AccountName ▾ | Corporation: CompanyName ▾ | ⊚ UserName |

Navigator

- ⊚ Dashboard
- ▥ User Guide
- ☒ Accounts
- ▣ Corporations
- ⊚ Navigator
- ⚙ ModBuilder
- ▨ References
- ☒ Tasks
- △ Issues
- 🗎 Reports
- 🏛 Compliance Manual

Questions

1001 — 1. Are you in the Financial Services Industry?
  ☒ Yes — 1005
  ☐ No

1002 — 2. What Area of the Financial Services Industry are you in?
  ☒ Derivatives — 1006
  ☐ Securities 1003 — 3. What Type of Trades do you Execute?
  ☒ Futures & Options on Futures
  ☒ Swaps & Options on Swaps
  ☒ Security Futures
  ☐ Physical/Cash Transactions
  ☐ Alternative/Other
  ☐ Securities (Stocks)
  ☐ Options on Securities 1004 — 4. In Which Asset Classes are you Active in Derivatives?
  ☒ Agricultural Commodity Futures and Options
  ☒ Metals
  ☒ Interest Rates
  ☒ Energy

UserName ▼

- Dashboard
- User Guide
- Accounts
- Corporations
- Navigator
- ModBuilder
- References
- Tasks
- Issues
- Reports
- Compliance Manual Account: AccountName ▼ | Corporation: CompanyName ▼ | © UserName References References
- All Reference Documentation — 1201
- All Reference Documentation Applicable to AccountName — 1202

FIG. 12

UserName ▼ | Account: AccountName ▼ | Corporation: CompanyName ▼ | © UserName

- ⊙ Dashboard
- ⊞ User Guide
- ▣ Accounts — 1302
- ▤ Corporations
- ⊚ Navigator — 1303
- ⚭ ModBuilder
- ▥ References
- ⊠ Tasks
- △ Issues
- 🖉 Reports
- 🗎 Compliance Manual Open Issues

Issues

| Number 1305 | Issue Date 1306 | Type 1307 | Assigned to 1308 | Priority 1309 | Due Date | Description 1310 | Resolution |
|---|---|---|---|---|---|---|---|
| 16-000001 | 02/10/16 | | | | | | |
| 16-000002 | 04/07/16 | Complaint | UserName | High | | User Complained about improper allocation | Currently Researching |
| 16-000003 | 04/07/16 | Registration | | Medium | | User improperly registered? Check foreign registrations | |

Report issue — 1304

FIG. 13

ARTIFICIALLY INTELLIGENT SYSTEM EMPLOYING MODULARIZED AND TAXONOMY-BASED CLASSIFICATIONS TO GENERATE AND PREDICT COMPLIANCE-RELATED CONTENT

CROSS-REFERENCE TO RELATED APPLICATIONS

This application is a continuation of U.S. patent application Ser. No. 16/605,433, filed Oct. 15, 2019, which was a U.S. National Stage Application filed under 35 U.S.C. § 371 of PCT Patent Application Serial No. PCT/US2018/028168 filed on Apr. 18, 2018, which claims the benefit of U.S. Provisional Application No. 62/487,181, filed Apr. 19, 2017, all of which are incorporated herein by reference, except that in the event of any inconsistent disclosure or definition from the present specification, the disclosure or definition herein shall be deemed to prevail.

BACKGROUND OF THE INVENTION

1. Field of the Invention

The present disclosure relates generally to compliance and legal services field, and more particularly, to systems and methods for intelligent regulatory classification through the creation of an attribute-based classification system of all qualitative data and utilization of an intelligent taxonomy structure to, among other applications, automatically generate regulatory compliance data and related information.

2. Description of the Background of the Invention

There has been an explosion of regulatory law promulgated in the United States. The length, quantity, and complexity of all of these laws are increasing rapidly. Currently, there are no solutions equipped to intelligently classify these obligations in a usable manner. Current processes (which are distinct from the processes contemplated by the present disclosure) are not capable of analyzing regulatory compliance issues in a similar manner, are inefficient, prone to error, and unable to efficiently respond to the ever-changing regulatory landscape. Further, current system-based services utilized in other regulatory compliance industry suffer from many further shortcomings, including not providing for dynamic generation of relevant data, alteration of the text itself, and cannot meaningfully support regulatory compliance in a continuously ongoing fashion. This problem costs companies millions of dollars in research and transaction costs, and spiraling inefficiencies.

SUMMARY OF INVENTION

The present disclosure contemplates, in one or more embodiments, a system that will quantitatively classify all regulatory laws via an assigned taxonomical structure. In one aspect, the system will query users to answer a series of intelligently curated questions based on a series of attributes. The curated questions are particularly created by the system designers to elicit user-specific information that is used by the back-end architecture to intelligently classify assign the regulations relevant to a specific company, and to automatically generate regulatory compliance information tailored to that company and its business operations.

In one embodiment, the present disclosure contemplates an intelligent sorting and curation of regulatory law, and legal-based content. It further contemplates the intelligent sorting and parsing of any qualitative structure of a set of text by parsing such words into an instructional string that can be allocated based on taxonomical structures.

In one or more additional embodiments, the present disclosure contemplates a quantitative classification via taxonomy of all laws and regulations in every jurisdiction. This can be done on a variety of regulatory levels, such as for cities/municipality laws and regulations, county-wide laws and regulations, state-wide laws and regulations, federal laws and regulations, and the laws and regulations of other countries. In some embodiments, the system automatically processes the regulations at each levels as a series of strings of text (word-based as a rule, law, or general text), which are distilled down to a basic version of text. That "lowest-common-denominator" string will then have a taxonomy applied to it. This taxonomy will be applied to all selected text strings, and the text strings will subsequently be sorted, classified, and utilized by the system to automatically generate regulatory compliance information in automated fashion.

In other embodiments, a system is provided having a graphical user interface that allows a user to enter responses to questions that are intelligently curated based on a series of attributes determined about the user. In particular, the user's answers to the curated questions elicit user-specific information and the systems back-end architecture, consisting of one or more distributed network servers, processors, and/or databases, utilizes the user's answers and the aforementioned text strings that are sorted and classified by the taxonomy in order to intelligently classify regulations as being of specific importance to the user's business. In particular, in some embodiments, the user's responses to the questions identify aspects of a company's business operations, such as what are the company's primary activities, is the company a financial institution, if so which financial products it is active in, what venues does the company execute trades in, what exchanges are the trades executed on, which assets is the company on, etc. A company's answers to certain questions may elicit new questions that further clarify the company's business operations. The system is an intelligent system, in part, because the questions have been specifically curated or designed to consider all aspects of business operation that may be relevant to one or more regulatory compliance requirements. In this way, the system interface elicits information in a way that allows the system to intelligently classify the company's business operations and identify particular regulatory compliance issues that are likely to be implicated. This allows the system to assign the regulations relevant to a specific company and automatically generate regulatory compliance information tailored to that company and its business operations on an ongoing basis.

In another aspect of the system, the system implements a graphical user interface that displays, in real-time, a dashboard of the most recent regulatory compliance information tailored to that company and its business operations and allows the company to view tasks identified by the system that need to be completed in order to comply with one or more regulations. The dashboard also provides a number of graphical elements that provide summaries of the number of regulatory bodies, modules, rules, requirements, and users associated with the company, as well as recent activity that users have undertaken using the system tools. In some embodiments, the dashboard further displays recent alert activity and provides access to new documents that have been published related to the regulations and requirements that the system identifies as being implicated by the business's operational data. In this way, user interface and dashboard provides a central hub where company representative and team members can log on, view outstanding tasks and the progress of those tasks in order to manage the workflow environment, as well as receive valuable information about regulatory issues that may affect their company and the steps needed to be taken to comply with those regulations.

In another aspect of the system, the system implements a graphical user interface that displays task information related to Rules and Requirements that the system determined to be applicable to the particular user. The task display may display information identifying the relevant regulatory entity, the particular rule number that is the basis for the task being generated, a description of the task, a stage identifying whether the task is complete or open, a due date for completing the task, a notification identifying how active the Rules or Requirements underlying the task are, among others. The task display may also the user to assign the task to certain users or consultants to be completed. Assigned tasks may be displayed on the user's dashboard display when the user logs into the system.

In certain embodiments, the additional information about the regulation and compliance steps is generated by system automatically by scraping third-party websites or by using a special form of natural language processing described herein to convert regulatory text into easy-to-read and easy-to-understand summaries that do not necessarily change the meaning of the regulatory text or provide legal advice, but make the text easier for a user to digest. For example, in some embodiments, the system may recognize key terms that are predicted to be difficult for the reader to comprehend (occasionally referred to as legalese) and may replace these words with alternative terms or definitions that assist the reader in comprehending the regulatory statute. Certain embodiments may also replace internal references to external statutory sections with a brief summary of what the external statutory section describes so that the user may read and comprehend the regulation without having to navigate to several regulations and aggregate their content to make sense of the regulatory text. These examples are merely illustrative and are merely illustrative and a person having skill in the art would recognize that variations may be made without departing from the scope and spirit of the present disclosure.

In several aspects, systems and methods in accordance with the present description create significant efficiencies and cost savings in legal, regulatory, and compliance workflows. These systems and methods enable firms to identify what laws, regulations, and rules apply to their firm without the need to utilize significant resources to achieve regulatory information. In other aspects, the system intelligently monitors and updates regulatory compliance information in an automated fashion, and allows for the system to maintain an up-to-date taxonomy and classifications system such that the companies and other users of the system can automatically be provided with updated regulatory compliance information response to new laws and regulatory requirements, or amendments and changes to existing requirements. In some embodiments, the system may atomically or periodically generates updated compliance and regulatory information. For example, the system may update and maintain regulatory manuals that can be output to a desired format (whether paper or digital format, such as Portable Document Format (PDF) or Extensible Markup Language (XML) to be distributed to the companies and its employees in order to inform them of any relevant changes that may affect company operations or compliance requirements.

In other aspects, systems and methods in accordance with the present description allow for a novel new way to parse regulations as text strings, in a manner that reduces qualitative words down to single-directional strings (that is, only one outcome is present based on the words in the string). The systems and methods apply a taxonomy onto each of those strings to support intelligent sorting.

In other aspects, systems and methods in accordance with the present description allow for a provide a regulatory alert index (RAI) that aggregates information related to rules, laws, and regulations, etc., and computes a score or ranking that describes how active each rule, law, or regulation is in the market place. In some embodiments, the RAI is calculated on a "task" level such that when there are two Rules relevant to particular task, and each one is independently active, then an aggregate RAI score would be generated and displayed next to the task that is representative of the activity implicated by both Rules. In some embodiments, the aggregate RAI score may be the sum of the RAI for each of the two Rules. In other embodiments, the aggregate RAI score may be a weighted composite score based on a number of factors, such as how active each Rule is, how many other Rules or tasks the respective Rule is associated with, etc. In this way, the system tracks tasks related to a user's business operations and provides a heat map of the activity surrounding relevant rules and regulations. The RAI score can take into account data points, such as enforcement actions, speeches, market commentary, rule publications, advisory notices (of all kinds), and other official regulator data related to the Rule at issue. In essence, the RAI score alerts the business user of how closely the business user should monitor this regulation for changes. Beneficially, the system allows the user to subscribe to alerts or update notifications for each Rule, and the user may utilize the RAI to identify which Rules are most important to that user.

In other aspects, systems and methods in accordance with the present description allow for importing and indexing service provider data in accordance with the hierarchical, taxonomy-based classification system. Generally, these systems and methods allow service providers to access the system and associate their products or services with a particular regulatory requirement, rule, module, industry, etc. Service providers may comprise any number of individuals such as regulatory technology providers, other technology service providers, consultants, attorneys, regulatory bodies or agencies, users of the system (or their employees and customers), and so forth. In one example, the service provider may use the GUI to access the system and select a particular regulatory requirement, rule, module, or industry that the service provider supports. The system will provide a form (e.g., having several text box fields) that is tailored to the selection and is designed to gather information relevant to the selection, such as may be needed to add the service provider information into the hierarchical, taxonomy-based database. The system then imports the service provider's information into the database. In one embodiment, the system may use an API function to index information that the user input into each text box field of the form by associating it with the relevant fields in the database. In other embodiments, the system may index the service provider's information based the text entered by the user into the form. For example, the one or more semantic or natural language processing techniques, as described further herein, may be used to identify key terms or phrases within the service provider's information. Once imported and indexed, the system then associates the service provider's product or service with the particular regulatory requirement, rule, module, or industry selected by the service provider. Although many benefits of this process may be realized upon review of the present description, one immediate benefit is that the service provider's product or service may be displayed on the system interface whenever another user views or interacts with the particular regulatory requirement, rule, module, or industry selected by the service provider. These systems and method thus allow for numerous monetization schemes, such as based on a fee or percentage each time a service provider accesses the system to import their product or service information, or a fee or percentage based on cost per impression or number of impressions, cost per click or number of clicks, cost per action for some specified action(s), click-through rates, cost per conversion or purchase, or cost based at least in part on some combination of metrics, which may include online or offline metrics, for example. These systems and method also create a central application store interface where service provider access and expand the functionality of the system.

In other aspects, systems and methods in accordance with the present description allow for generating real-time regulatory compliance alerts using the hierarchical, taxonomy-based classification system. Historically, regulatory compliance has been reactive instead of proactive. Companies and users must review their employees' past actions to determine which activities have generated risk, and in some scenarios, which activities have led to violations. Aspects of the present description reverse the traditional model and are designed to convert regulatory compliance into a proactive, forward looking process. Along these lines, the system may implement a background process that runs on a business user's system and monitor's the activities of the user's employee to generate real-time regulatory compliance alerts. For example, in certain embodiments, the system may monitor a user's interactions and activities (e.g., email text, chats, keystrokes, voice-conversations that are converted to text, or any other type of data that can be ingested into the system using the Internet of Things) and compare the interactions and activities with a regulatory data set to determine which regulations are implicated by that user's business activities. This allows the system to generate real-time regulatory compliance alerts based on a user's interactions with the system in order to, for example, to generate alerts when a user's employee may be about to (or are) violating a regulatory obligation, to generate alerts when regulations that are particularly applicable to the user's daily activities change, or to generate alerts when new regulations issue that are applicable to the user's activity. In addition, the system may also use the monitored information to assist the business in determining in real-time which regulatory obligations are particularly applicable to the user's business, such that the business may implement a compliance strategy. Although many uses of these systems and methods will be apparent upon review the present description, these uses beneficially allow the user to leverage the system's hierarchical data system to implement real-time regulatory compliance alerts and receive compliance strategy feedback.

In other aspects, systems and methods in accordance with the present description allow for a new and novel process for automatically generating proposed and/or model regulatory text. This new and unique process realizes previously unforeseen benefits by allowing aspects of the presently described system to proactively generate new regulatory and compliance-related text based on existing laws and regulations. By way of example, in certain embodiments, the system may retrieve data related to existing laws and regulations from numerous sources, such as published legal text, issued or proposed changes to laws, best practice publications, standards, issued regulatory text or proposed changes, enforcement actions, speeches, clarification notices, etc. The system circuitry may then process this information to identify a mapping of semantically paired relationships between existing laws and existing regulations. The system circuitry then uses the machine learning techniques described herein to generate an initial model that is trained using the mapping of paired relationships between existing laws and regulations. The trained model may then serve as a function to be applied to newly issued laws. By applying the trained model to newly issued laws, the system can generate proposed or model regulatory text for those new laws. Although a number of novel uses are contemplated within the scope and spirit of the present disclosure, in certain embodiments, the proposed or model regulatory text can be utilized to, for example, generate best practices guidelines for firms, write model regulations for trade associations, write operating standards for industries, or even create an entire model regulatory framework for previously unregulated industries. These examples are not intended to be limiting inasmuch as there are many applications that will become apparent to one with skill in the art upon examination of the following figures and detailed description.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles involved and to enable a person skilled in the relevant art(s) to make and use the disclosed technologies.

FIG. 9 is an exemplary display for implementing a graphical user interface according to certain embodiments that dynamically displays relevant regulatory tasks that were assembled by the system using the taxonomy.

FIG. 10 is an exemplary display for implementing a graphical user interface according to certain embodiments that allows a user to response to questions generated by the system.

FIG. 11 is an exemplary display for implementing a graphical user interface according to certain embodiments for generating and updating compliance manuals.

FIG. 12 is an exemplary display for implementing a graphical user interface according to certain embodiments for displaying rules and related documents relevant to a business's operational data.

FIG. 13 is an exemplary display for implementing a graphical user interface according to certain embodiments that allows users to track heightened issues.

DETAILED DESCRIPTION

Figure 1:
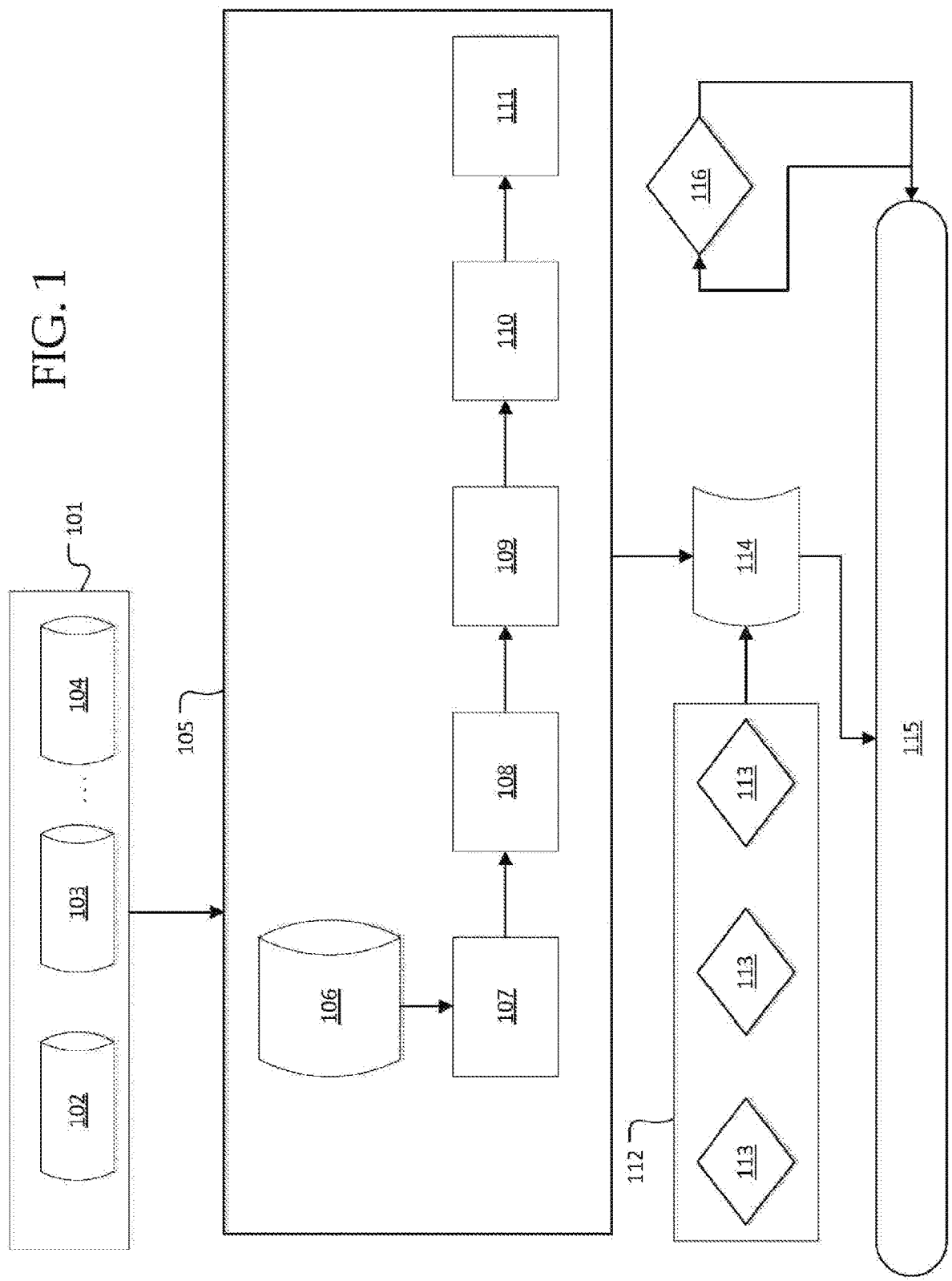
FIG. 1 is an exemplary system architecture diagram depicting the high-level flow and parsing process of qualitative information prior to the application of a taxonomy to the parsed data.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrases "in another embodiment" or "in further embodiments" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors By way of introduction, systems and methods in accordance with the present description provide for, among other applications, an innovative means to (a) monitor rules and regulations to identify the most recent regulatory data, classify and assign attributes to that data, and automatically generate summary and explanatory information for subparts of the laws or regulations within that data, (b) create a taxonomy system that queries users to identify attributes about the user or the user's company and maps relevant regulations and laws to their responses, (c) interpret these attributes and the regulations and laws in an intelligent and targeted manner in order to assign particular regulatory compliance information, as well as summary and explanatory information that provides assistant to the user or business in complying with the regulation or law, to the specific user based on the qualities of that user that the system determined to be applicable to the business's operational data, (d) provide a graphical user interface that allows a user or employee of a business to log into the system and access the most recent regulatory compliance information for that user or business in real time, create, assign, and track the completion of tasks that may be required to be completed to comply with the regulations, (e) monitor websites and other sources of regulatory compliance information in order to identify the most recent regulatory information across all industries, (f) provide portal to that allows users to subscribe to alerts that notify the user of new regulations in real time and assists the users in identifying new regulatory obligations related to the user's business, (g) dynamically generate compliance manuals for a company to use in its daily business operation and automatically update those manuals when new regulatory data is identified, and (h) implement a system that generates a novel and previously unknown regulatory alert index that assists users in identifying how active a particular business requirement for complying with a regulation is and how likely it is to be updated.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Referring now to the figures, FIG. 1 depicts an exemplary system architecture diagram depicting the high-level flow and parsing process for qualitative information prior to the application of a taxonomy to the parsed data according to some embodiments. Segment 101 represents a set of qualitative content data that is to be broken down and parsed by the system circuitry and processors. In one example, the qualitative content represents a series of regulatory laws for various jurisdictions and different levels of government within each jurisdiction. In certain embodiments, the qualitative data content about the regulation and compliance steps is generated by system automatically by scraping third-party websites.

Blocks 102, 103, and 104 represent sets of qualitative data at one level and jurisdiction to be broken down and parsed by the system circuitry and processors. For example, block 102 may be the Code of Federal Regulations, an indexed set of the government's rules. Block 103 represents a second set of qualitative data to be broken down and parsed by the system circuitry and processors. For example, block 103 may be the Federal Register, an indexed publication of government regulations and other information. Block 104 represents a third set of qualitative data to be broken down and parsed by the system circuitry and processors. Block 104 (and additional blocks not shown) may represent information retrieved from a number of data sources storing contextual about each of the laws, rules, or regulations, in addition to those discussed in connection with blocks 102 and 103. By way of illustration but not limitation, block 104 may include data representing speeches, updates to existing rules, official comments on regulations, or any other data that can be broken down, parsed, and eventually combined with a taxonomy created by the system.

The elements of segment 105 represent a high-level diagram of the parsing process for each set of qualitative data contained in segment 101. In the specific example discussed above, block 105 represents a manner of parsing of the Code of Federal Regulations (block 102), Federal Register (block 103), and other contextual data (block 104 and others). A similar manner of parsing, however, may be applied in other fields and to other similar qualitative data sets of relatively equivalent structure and complexity.

Block 106 represents one or more databases associated with the system, which will accept the data from blocks 102, 103, and 104, and deposit the data into an aggregated and unparsed form. Block 107 represents the first level of processing and parsing of the relevant qualitative data. For example, block 107 will represent a system operation that parses the data to generate a "Category" of data, which may be a vertical category of regulatory law or set of laws that are all related to a single regulatory entity or specialized business area, such as those laws and regulations of the Commodity Futures Trading Commission. Additionally, the system may further process the data at this stage to segregate data by jurisdiction and type, such as federal regulatory obligations, state, county, municipal, and so forth.

Block 108 represents the second level of parsing of the relevant qualitative data. For example, block 108 will represent a system operation that parses the data to generate a "Module" of data. A Module will contain a set of discrete rules related to the rule, law, or regulation. In some embodiments, a Module may contain only data promulgated by the same entity or one or more closely related entities, such as one that falls within the umbrella of the vertical category 107. A Module thus will often be a set of qualitative or quantitative rules from individual organizations, such as the National Futures Association, the Chicago Mercantile Exchange, the Intercontinental Exchange, or that of the Commodity Futures Trading Commission itself (all of which would be overseen by the Commodity Futures Trading Commission described in vertical block 107).

Block 108 and its subsequent components may also include "quantitative" data or numerical components retrieved from the qualitative data, for which this similar process will also apply.

Block 109 represents the third level of parsing of the relevant qualitative data. For example, it will represent a system operation that parses the data to generate a "Subject," which is a subsidiary of each distinct Module. In this case, a subject will be a collection of rules related to a particular regulatory topic that is governed by or falls under the one or more related organization(s) in the corresponding Module.

Block 110 represents the fourth level of parsing of the relevant qualitative data. For example, it will represent a system operation that parses the data to generate a set of Rules relating the operational requirements of the entities in the particular Subject and Module, which may be a subsidiary of each distinct Module. For example, in some embodiments, a Module would be made up of Subjects and Rules related to each Subject, and the Rules would be the most granular level in which the qualitative data is broken down and presented by the original creator of the qualitative data (i.e., the source from which the qualitative data was retrieved in block 101). In some embodiments, this is the last layer of "sorting" of the original qualitative data, and the system will not now need to process that the sorted data and generate additional date that may be used by various processes described herein, although it is envisioned that certain sources of qualitative data may contain contexts and fields that may require additional sorting steps to reach the most granular level, and a person of skill in the art would recognize that in such a scenario, one or more additional sorting steps may be preferred or even required.

Block 111 represents the fifth level of parsing of the relevant qualitative data. For example, it will represent a system operation that parses the data to generate a "Requirement." This step is the step in which a "rule" has its language parsed, and it is broken down into a single string. For example, each single string will be made up of a basic pattern of language which cannot be broken down further without causing unintelligible text. In some embodiments, each string may be created by a system administrator that manually breaks down each regulatory requirement and law into the smallest discrete steps that may implicate a related regulation or a regulatory compliance requirement. In contrast to traditional natural language processing, the system thus associates these strings as arguments at the most discrete level in a way that allows the system to tie each string to information specified by the user in response to the questions. For example, some embodiments may use a special form of natural language processing described herein to convert regulatory text into easy-to-read and easy-to-understand summaries that do not necessarily change the meaning of the regulatory text or provide legal advice, but make the text easier for a user to digest. The natural language processing may also be used by the system to determine relationships between certain sets of the qualitative data. For example, the system may determine that one Rule in one Module is related to a second rule in another Module. In this way the system can intelligently and automatically learn relationships between discrete Modules, Subjects, Rules, and so forth, and utilize these relationships in determining additional Requirements that may be relevant to particular business user. The building of these relationships also facilitates other aspects of the system, such as the RAI and heat map features that identify which Rules and Requirement are most active and need to be monitored more closely. In some embodiments, the system may also generate and maintain a data matrix that links certain sets of qualitative data to each other (at any level). For example, the system or an administrator may link a Rule or Requirement to an entire Module, so that the Rule or Requirement is always marked as relevant to the particular Module. This linking of relationships may occur on any level and may be customized for a particular business. In this way, the linking further facilitates the system intelligently and automatically learn relationships between discrete sets of data, and allows the system to customize the relationships for a particular user.

The process described in connection with blocks 107 through 111 of FIG. 1 may contain further intermediary components (not depicted). In such case, block 111 would still represent the most granular level data, and block 110 would represent the second-to-last most granular level of data, and so forth.

It is important to note that the system also provides an update processor which allows the components associated with block 111 to be updated or altered at any time either manually, or via API interface, which will automatically populate downstream and update all downstream processes. For example, this means that changes to the qualitative data, or the base level requirements, would be implemented either manually or automatically in related processes carried out by the system. Thus, the changes would automatically update the downstream database of updated rules. In this manner, the system is able to provide an up-to-date taxonomy of the most recent rules and requirements of the regulatory requirements associated with the different data sets 102, 103, 104.

Segment 112 represents the Taxonomy question database. This database will be a combination of questions which are structured in the easiest possible manner with which all questions in a qualitative data set will be sorted. The maximum number of questions to be utilized will depend on the size of "Requirements" in the qualitative data set, but should be no larger than the natural logarithm of the number of requirements.

Blocks 113 represent the individual taxonomical questions that would be utilized in the creation of targeted user outputs. The system (e.g., Taxonomy engine 114) utilizes the questions in the Taxonomy question database 112 to intelligently structure a series of questions needed to elicit the user's information and to determine regulatory compliance requirements. For example, a user's answer to one question in the affirmative may trigger the system to generate additional questions related to new regulatory issues in order to determine whether the user's answers implicate an additional regulatory requirement.

Block 114 represents the Taxonomy engine. This engine will aggregate the answers to the taxonomy questions from block 113 and apply them to the parsed qualitative text in its most granular form, in this example, the Requirements, as described in block 111. The Taxonomy engine will separate, classify, and sort the user's answers to the taxonomy questions, so as to only provide the user with qualitative data relevant to it.

Block 115 represents the user's parsed qualitative data after it has been separated, classified, and sorted by the taxonomy. In this example, it would represent only the regulatory rules, laws, or other qualitative data that is applicable to the user based on the user's answers to the taxonomy questions. Block 115 represents the final output of the prior processes. In some embodiments, block 115 includes a summary of regulatory compliance data related to a user's business operations. As will be discussed further in connection with FIGS. 8-14, the summary may include a list of requirements a business user should be aware of given the nature of the user's business operations, or a summary of tasks that the business user must address based on regulatory obligations related to the business user's business operations. The system may utilize this information to generate information and content to be included in reports or compliance manuals, or displayed on the graphical user interfaces implemented by the system, such as the user's dashboard, tasks summary page, issues page, reports page, or compliance manual page.

Block 116 represents the creation of an alert or update notification that will be generated that will inform the user that the output from processes described in connection with blocks 101 through 115 is different than it was previously. This allows the system to automatically inform the user of updates and changes in relevant regulatory compliance information and, if needed, generate new manuals and regulatory compliance information. The user will then be taken back to the final output upon selecting that she understands there was a change.

Figure 2:
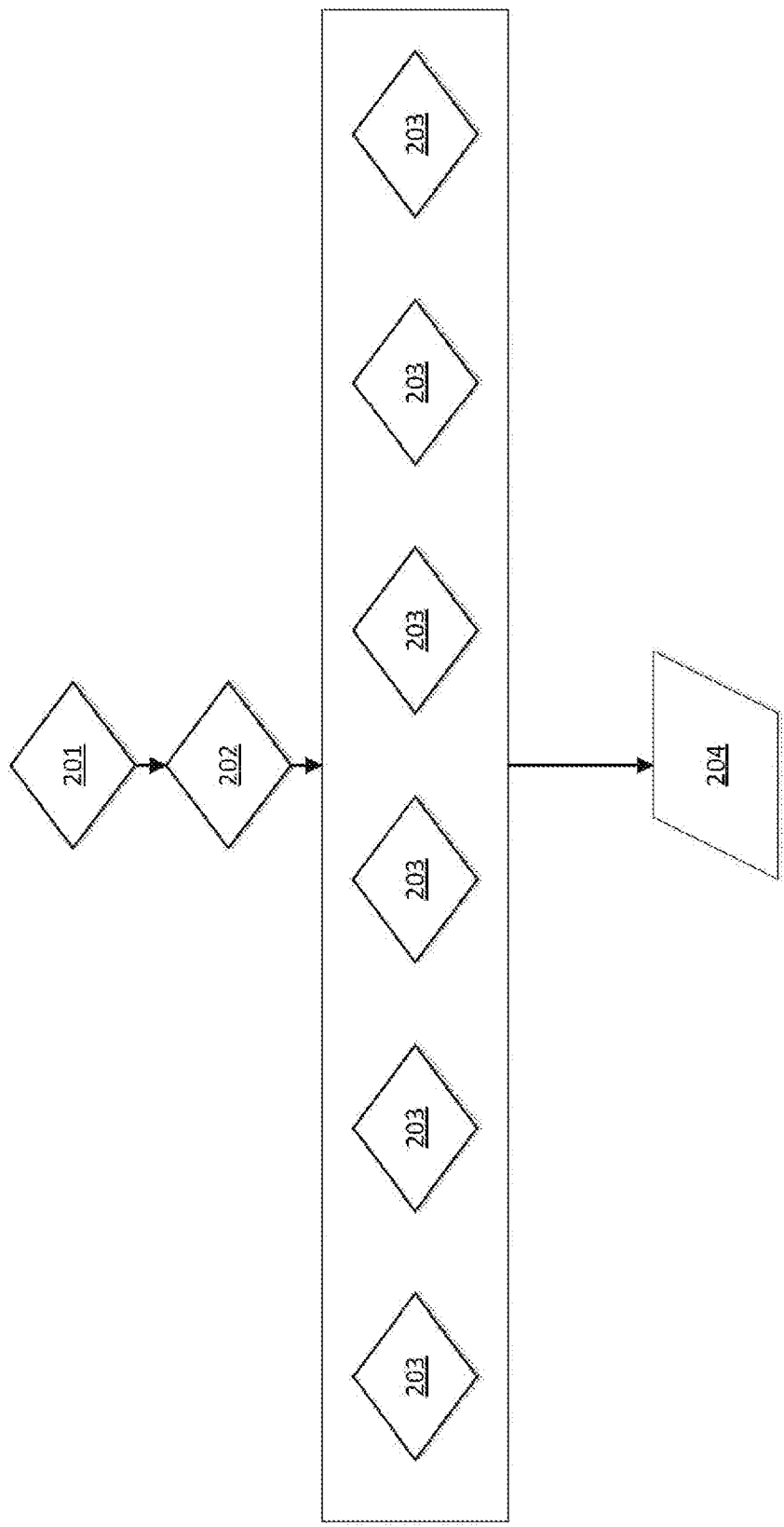
FIG. 2 is an exemplary diagram of the "taxonomy" data structure, and illustrates the manner in which a taxonomy is created from a series of qualitative texts.

Referring now to FIG. 2, the process for implementing and using the taxonomy based classification system according to certain embodiments is illustrated in greater detail. Block 201 represents the collection of a qualitative set of data. For example, a set of regulatory law coded via the Code of Federal Regulations or Federal Register, as described segment 101 of FIG. 1.

Block 202 represents an aggregation and classification of relevant qualitative data and review of the components of the relevant data as described in connection with blocks 106 through 111 of FIG. 1. The aggregation and classification of relevant qualitative data and review of the components of the relevant data may ultimately result in the creation of a data structure similar to that described in connection with FIG. 7.

Block 203 represents the individual taxonomy questions to be developed in order to properly analyze qualitative data from block 201. In one embodiment, the questions are created by reviewing the content sets and sorting based on the characteristics of each component of the qualitative set. These will be aggregated and structured in a bottom-up approach until a set of finite questions can be created equal to the natural logarithm of the total number of discrete "Requirements." For example, a set of Regulations would be reviewed, and a number of questions would be developed based on the common attributes of each of those regulations. The questions represent each consideration that may necessary to make a determination about whether the user is in compliance with all regulatory requirements of not only the law in question, but any law of regulatory requirement that may be triggered in response to a question for that law. In addition, some embodiments include screening questions outside of the direct attributes of the Requirements in order to create more targeted Taxonomies such that the process may be streamlined for particular users.

In certain embodiments, the system circuitry may implement a process for analyzing bodies of regulatory-related text and identifying certain keywords within the texts to intelligently create the taxonomy of questions that will allow for the classification of regulatory and other content. For example, as the system is extended to cover new regulatory bodies, jurisdictions, or categories of data sources, the system will often need to create new sets of taxonomy questions and answers that are needed to elicit the required information from users of the system. In some embodiments, an artificially intelligent ("AI") process may be employed utilizing Supervised Learning methods (for inferring functions from training data, etc.) and/or Unsupervised Learning methods (using clustering and other intelligent sorting methods, etc.) to analyze sources of data and generate a series of questions. While different processes are contemplated, including those described further in connection with FIG. 15, one such process may utilize natural language processing to parse regulatory compliance text and identify, for example, noun/verb relationships (as well as other grammatical relationships) within the regulatory compliance text to automatically generate a Q&A in natural language speech. In some instances, sets of Q&As that have been previously generated (either manually or using a similar process as described in this embodiment) can be used a training set for the natural language processing algorithm, such as by using machine learning, deep learning, transfer learning, or other modern AI-based tools to synthesize results of various applications in order to improve the accuracy of predictive analytics and data mining applications (ensemble models). In this way, the artificially intelligent process can better identify grammatical relationships within the body of text to craft the new set of questions.

Block 204 represents the Taxonomy Engine, which may be comprised of one or more servers, distributed databases in operative communication over a network, and dedicated circuitry, such as may be implemented using a programmable logic array (PLA), application-specific integrated circuit (ASIC), or one or more microprocessors, programmed to execute taxonomy logic that causes the system to perform one or more of the steps described in connection with FIGS. 1-14, In some embodiments, the taxonomy logic may be fully embodied as software, firmware, or hardware. The Taxonomy questions and data from blocks 202 and 203 will be entered into or communicated to the Taxonomy Engine 204 and combined with relevant qualitative data set as described in connection with blocks 101 through 116 of FIG. 1. Thus, in one aspect, the Taxonomy Engine aggregates parsed qualitative data, generates or receives the individual taxonomy questions, receives data representing a user's answers to the taxonomy questions, and analyzes those answers to identify subsets of discrete requirements (as described further in connection with element 111 of FIG. 1) that may be related to the particular user or the user's the business operation data. In some embodiments, the Taxonomy Engine will also retrieve and process the data necessary to implement the graphical user interface features discussed further in connection with FIGS. 8-14.

Figure 3:
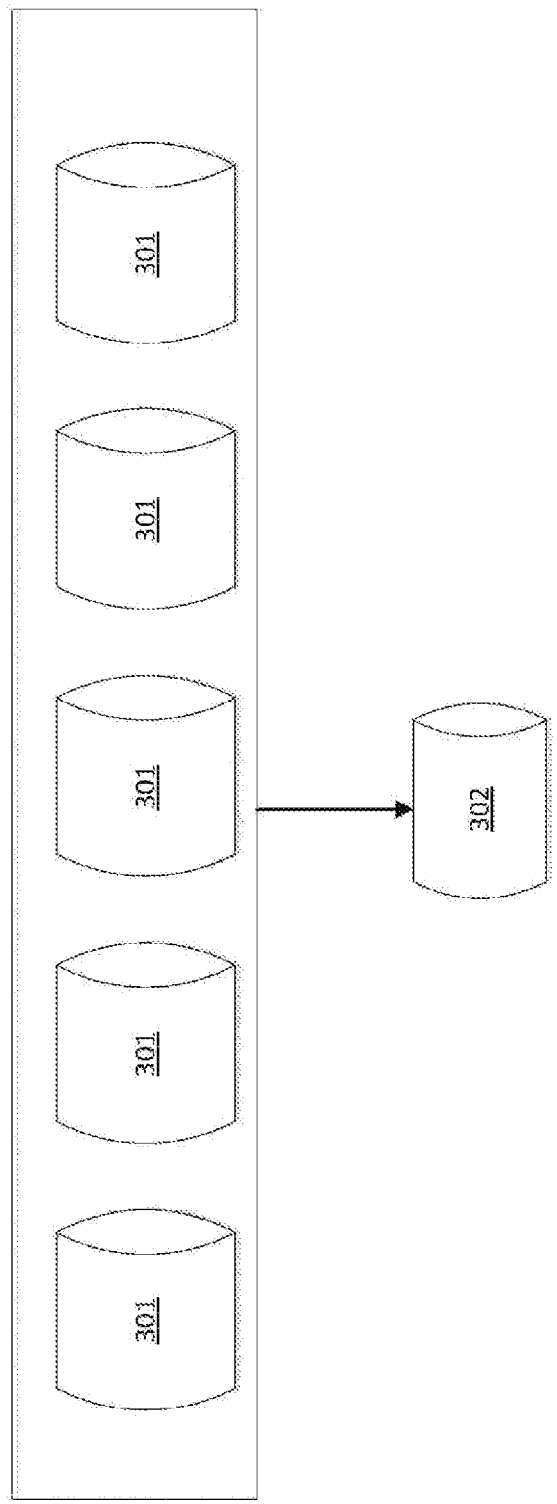
FIG. 3 is an exemplary diagram of the data feed process and migration of regulatory information into local servers and databases that enables reduction of the qualitative text into parsed strings onto which the taxonomy may be applied.

Referring now to FIG. 3, blocks 301 represents the qualitative data that will feed into the qualitative database prior to processing. For example, the blocks 301 may represent the Code of Federal Regulations, the Federal Register, and other legal and law-based content, as well as any of the contextual data that is retrieved from one or more data sources.

Block 302 represents the database that will house all of the qualitative data, both pre-sorted, and post-sorting and after application of any relevant changes. Database 302 may comprise a single database or one or more distributed database in operative communication over a network, such as the Internet.

Figure 4:
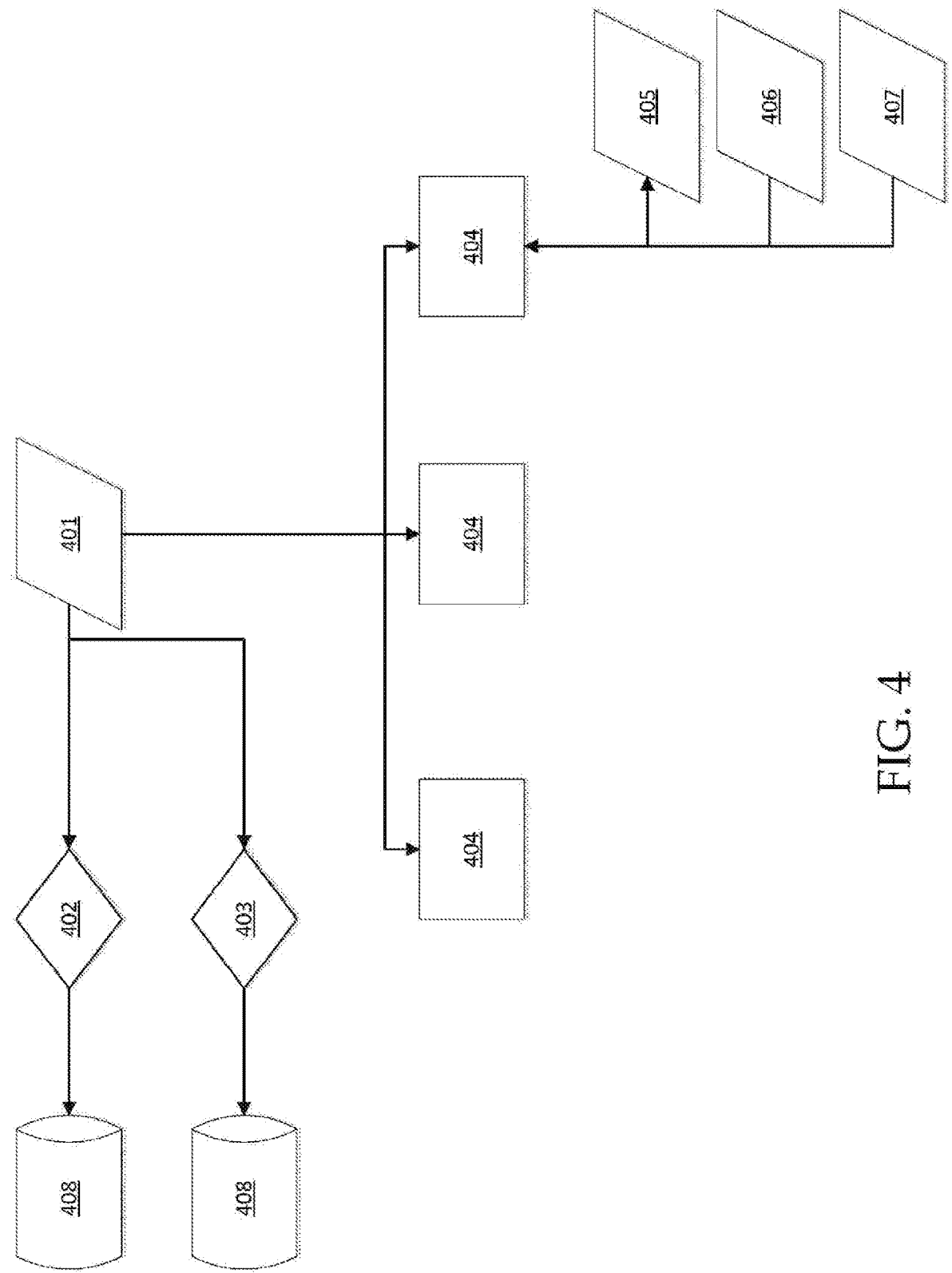
FIG. 4 is an exemplary diagram of how the system processes the most granular level of data to augment and generate summaries to be utilized in the user processes.

Referring now to FIG. 4, the process for breaking down a source of qualitative data to generate rules and requirements using the taxonomy based classification system according to certain embodiments is illustrated in greater detail. At block 401, the system receives the same rules as generated and described in connection with block 110 of FIG. 1. In particular, block 401 represents the fourth level of parsing of the relevant qualitative data, and in some embodiments, may represent a system operation executed by the Taxonomy engine that parses the data to generate a rule that may be a subsidiary of each distinct Module.

At block 402, the system extracts or retrieves the actual text of the rules or data set for block 401 as pulled directly from the qualitative data set. In one example, block 402 would be the final level of sorting of the qualitative data to generate distinct Modules of subjects and rules on a particular topic. The system will further process the data in each distinct Module to generate additional data used by the taxonomy engine, but, according to some embodiments, the modularization of the data in block 402 allows the system to keep the qualitative on distinct topic separate so as to maintain the integrity of the system's process that generates unique and tailored content for each user or business, as described further herein. However, a person of skill in the art will recognize that other embodiments may implement alternative data segregation schemes without departing from the spirit and scope of the present disclosure.

At block 403, the system creates or retrieves a summary text of data set for block 401 that may first be created manually by an administrator to provide a helpful, user friendly summary of the relevant qualitative data, but may subsequently processed and created automatically when new updates to the qualitative data are discovered by the system. In some embodiments, the summary text of data can be used by the system when displaying the dashboard when a user is authenticated and logs into the system, as well as the content for one or more of the other graphical user interfaces described in connection with FIGS. 8-14.

At blocks 404, the system retrieves the same description as generated and described in connection with block 111 of FIG. 1. In particular, block 404 represents the final level of parsing of the relevant qualitative data. For example, it will represent a system operation that parses the data to generate a "Requirement." This step is the step in which a "Rule" has its language parsed, and it is broken down into a single string. For example, each single string will be made up of a basic pattern of language which cannot be broken down further without causing unintelligible text. In some embodiments, each string may be created by a system administrator that manually breaks down each regulatory requirement and law into the smallest discrete steps that may implicate a related regulation or a regulatory compliance requirement. In contrast to traditional uses natural language processing, the system thus associates these strings as arguments at the most discrete level in a way that allows the system to tie each string to information specified by the user in response to the question. Some embodiments may also use natural language processing to convert regulatory text into easy-to-read and easy-to-understand summaries that do not necessarily change the meaning of the regulatory text or provide legal advice, but make the text easier for a user to digest. The natural language processing may also be used by the system to determine relationships between certain sets of the qualitative data (e.g., Requirements, Rules, Subjects, Modules, etc.) so that other aspects of the system, such as the RAI and heat map features, may utilize these relationships to identify which Rules and Requirement are most active and need to be monitored more closely.

At block 405, the system retrieves the summary text of a single Requirement, or one of the blocks 404, that may first be created manually and subsequently processed and created automatically generated for each particular regulatory requirement. For example, it is a summary text of the most granular rule of a Regulation that will be used by the system to generate content to be displayed on the graphical user interfaces, or used in alerts or notification updates. Portions of the summary text may come from content generated by the system administrator, or through the natural language processing processed described herein. The summary text may also include information that can be pulled from the database when the system is dynamically generating an output, such as a compliance manual, task text, or other application. In this way, the system may retrieve the relevant summary text related to the rules and/or requirements for a particular user's business operations and compile them to generate a compliance manual, task text, or other application.

Additionally, the summary text may also include clarification data that may be displayed alongside the summary text or in a pop-up as the result of a user hovering over or clicking on the summary information for particular Requirement. The clarification data may include any information that the system administrator generated in order to assist the business user in understanding or assessing the Requirement (e.g., information explaining definitions found within the Rule or Requirement, information explaining how the Rule or Requirement fits into the regulatory scheme for the particular regulator, information describing related Rules and Requirements that the company should also be aware, or other text explaining nuances of the particular Rule or Requirement). Similarly, particular text within a Requirement or summary text may be marked as definition, and any time the text is used within the system, the text may link to clarification data that includes a definition of that term (such as statutory definition, or text from another Rule or Section describing the term).

At block 406, the system generates or retrieves instructional language text of a single Requirement, or block 404, that may first be created manually and subsequently processed and created automatically. For example, in some embodiments the instructional text contains information describing the business requirements and formal requirements for complying with regulatory obligations so that the company may determine what to do in order to comply with a Requirement. In certain embodiments, the instruction text contains information describing task information related to Rules and Requirements that the system determined to be applicable to the particular user, similar to the information displayed on the task display described further in connection with FIG. 9. Similar to the summary text, the instructional text may include information that can be pulled from the database when the system is dynamically generating an output, such as a compliance manual, task text, or other application. Portions of the instructional text may come from content generated by the system administrator, or through the natural language processing processed described herein. Instructional text may also come from one or more secondary sources associated with the Requirement when it was retrieved, such as speeches, updates to existing rules, official comments on regulations, or other content related to the Requirement or to the corresponding Rule, Subject, or Module.

At block 407, the system generates or retrieves compliance manual text of a single Requirement, or block 404, that may first be created manually and subsequently processed and created automatically. Similar to the summary text and instructional language, it will be the text that is automatically pulled from the database when the system is dynamically generating an output, such as a compliance manual, task text, or other application. In some embodiments, the compliance manual text will comprise text pulled directly from the Rules or from documents, speeches, or other texts that were published by the regulatory agencies that publish the rules. In other embodiments, the compliance manual text may be a restatement of the Rule in general terms without specific references to other regulatory texts. Portions of the compliance manual text may come from content generated by the system administrator, through the natural language processing processed described herein, or from the original qualitative data that was retrieved and sorted by the system. The compliance manual text may be particularly helpful to be compiled inserted into a holistic compliance manual based on all of the Requirements that apply to a particular user's business. In some embodiments, these manuals may be automatically generated when a user first uses the system, as well as alerts or new manuals generated when the rules change.

It is important to note that the data and information determined in connection with blocks 404 through 407 can be updated or altered at any time either manually, or via API interface, which will automatically update all downstream processes. Here, it means changes to the qualitative data, or the base level Requirements (block 404), along with any updates or alterations to any of the dependent text of block 405 through 407. This could be implemented either manually or automatically. Here, it means the updates or alterations to the Regulatory Requirement themselves, and any text that was interpretive of this data and dependent on such data. Thus, these updates to blocks 404 through 407 would automatically update the downstream database of updated rules. In some embodiments, a user may utilize the graphical user interface to subscribe to update notifications. In this instance, the update notification may be displayed on a graphical user interface (such as the user's dashboard when the user logs into the system) or may be incorporated into the user's compliance manual and automatically sent to the user when the system identifies that material related to that user's business has updated. In these scenarios, the system allows the user to maintain up-to-date recognizes and dynamically compile the most recent and relevant information.

Figure 5:
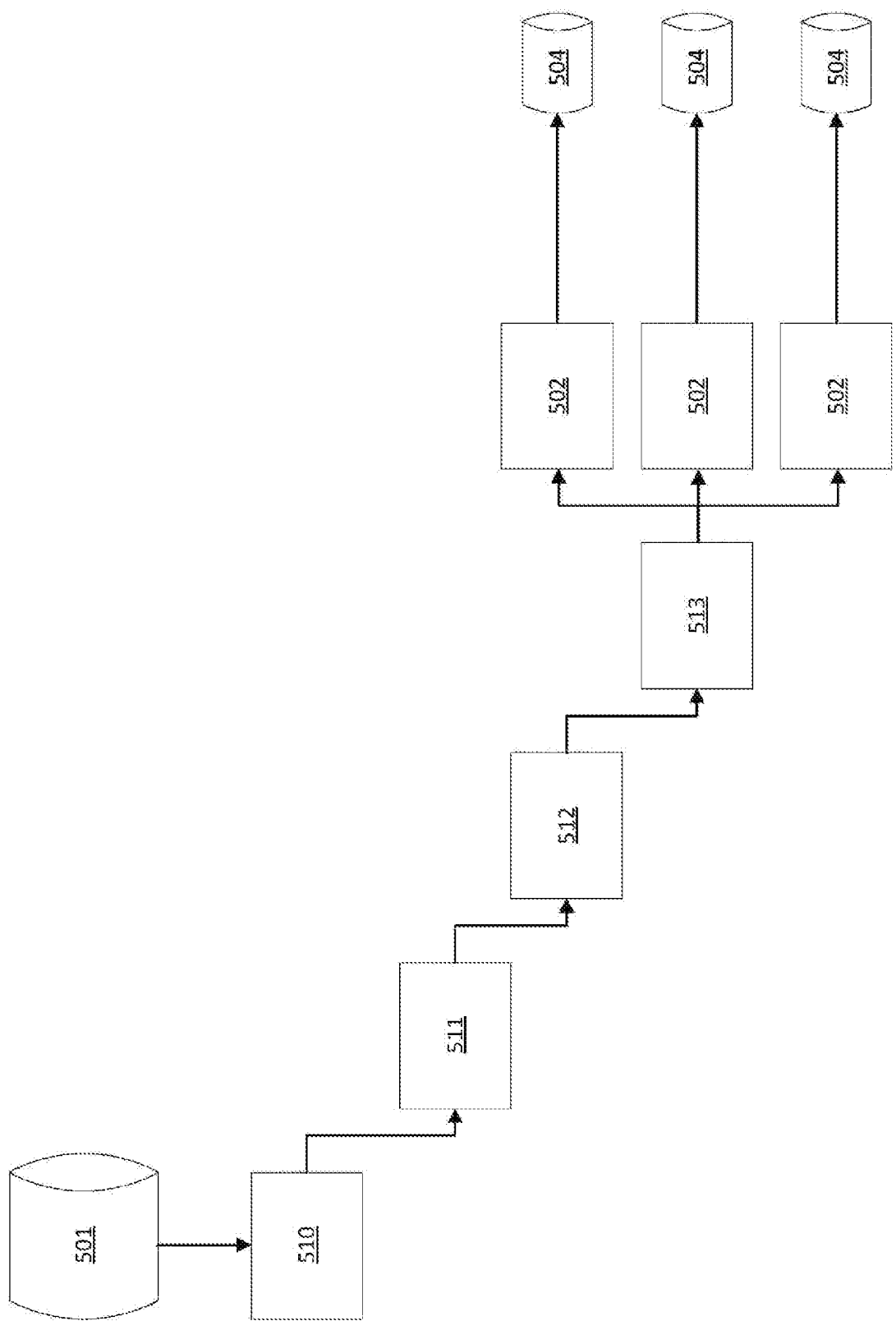
FIG. 5 is an exemplary flow diagram of a parsing process for a set of qualitative data according to some embodiments.

Block 408 represents the database that receives the data from blocks 402 and 403. Database 402 and 403 may each comprise a single database or one or more distributed database in operative communication over a network, such as the Internet Referring now to FIG. 5, FIG. 5 represents a more detailed diagram of the hierarchy generated according a flow process similar to that described in connection with segment 105 of FIG. 1, except that it includes multiple ultimate Requirements (as described in connection with blocks 101 to 111 of FIG. 1). Here, at block 501 the qualitative data is split up into multiple Requirements 502 before processing. Requirements 502 represent the most granulized level. The vertical information for each requirement 502 is generated by the processing steps that precede the requirement in blocks 510 (category), 511 (module), 512 (subject), and 513 (rule), similar to as described in blocks 101 to 110 of FIG. 1. Although depicted as a single vertical stream, one of skill in the art would recognize that each rule may have a vertical stream with a number of branches at each level as may be appropriate.

Blocks 502 thus represent a similar description as described in connection blocks 101 through 111 of FIG. 1, but shows that there may ultimately be multiple Requirements for each rule or qualitative data set 501. One of skill in the art would recognize that there are an infinite number of Requirements and the number is only restricted by the size of the original qualitative text that is being granulized into its base form.

Block 504 represents the entry of the granulized data into the database. The entry of the granulized data may take a form similar to that described in connection with FIG. 7.

Figure 6:
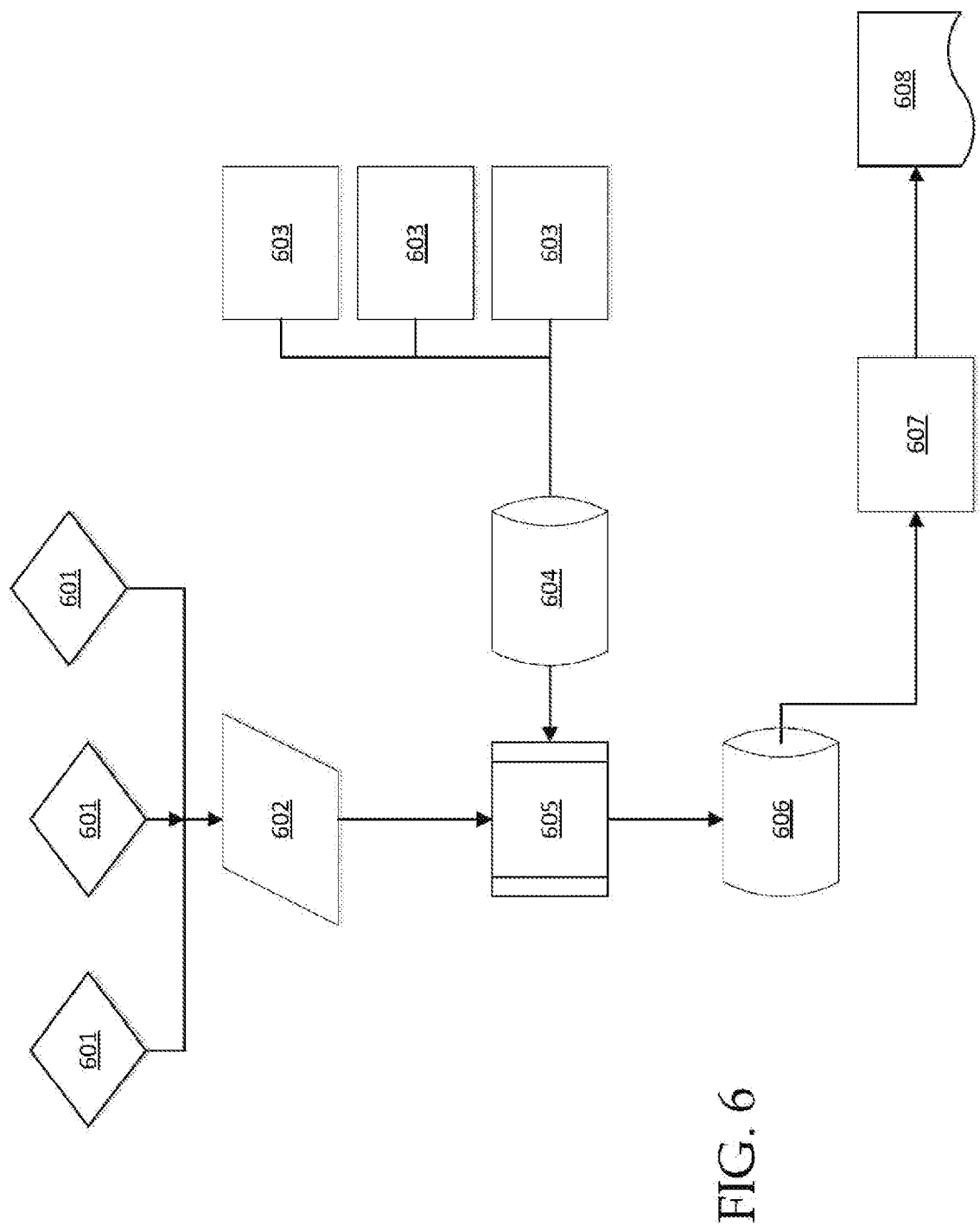
FIG. 6 is an exemplary flow diagram illustrating how the requirements are granulized and the taxonomy applied to support the intelligent creation and automatic updating of a regulatory compliance manual.

Referring now to FIG. 6, an exemplary flow diagram according to certain embodiments is shown illustrating how the requirements are granulized and the taxonomy applied to support the intelligent creation and automatic updating of a regulatory compliance manual. Blocks 601 represents a similar description as described in connection with blocks 101 to 113 of FIG. 1, although here three distinct qualitative data sets are depicted. In this example, the three distinct qualitative data sets have been chosen by the system because they have been determined to be relevant to the user's business operation data. In this regard, block 602 represents the user's selection of the answers to the Taxonomy questions and the system utilizes these answers to help identify the user's business operation data. Block 603 represents a similar description as described in connection with blocks 404 through 407 of FIG. 4, where the system receives the Requirements for the user's business, generates summary text related to the Requirements, generates instruction language related to the Requirements, and generates manual text to be used in dynamically generated output. At block 603, the system may also identify any alteration or changes made to the base level requirements or the Requirement itself (including, but not limited to the data changed or new data identified as it related to the summary text, instructional language, and manual text as described in connection with blocks 405 through 407 of FIG. 4). For example, in addition to storing the text or summary of text of the Rule or Requirement, the system may also generate and store altered text as may be needed to support any number of other applications. In some embodiments, the system may store altered text that converts each Rule or Requirement into compliance verbiage, task management verbiage, or training verbiage among other applications. The system may then dynamically draw from each of these verbiage texts when constructing a product (such as a manual, task list, etc.) to display or provide to the user. Each verbiage text will thus reflect the corresponding rule and regulatory requirement.

Block 604 represents the database of all Compliance Manual Requirements, as described in connection with block 407 of FIG. 4, based on the qualitative text entered. In the previously discussed example, it refers to Federal Regulations and text of federal regulatory law. It may also refer to the database of any Requirements (as described in connection with blocks 101 through 111 of FIG. 1), or any alterations or changes made to the base level Requirements (as described in connection with blocks 101 through 111 of FIG. 1) to create a new altered data set.

Block 605 represents the application of the answers to the Taxonomy (as described in block 602) to the database of requirements (as described in block 604), that the system will then classify and sort into the relevant obligations. For example, the system will sort the data in block 604 and eliminate inapplicable Regulations.

Block 606 represents the database into which the sorted qualitative data would be deposited. In this case, it is the sorted Compliance Manual Text (as described in connection with block 407 of FIG. 4) that is based on interpretation of the base level text in the base Requirements (as described in connection with blocks 101 through 111 of FIG. 1).

Block 607 represents the user output that the user would view of the sorted qualitative data, in this case, the compliance manual obligations. In some embodiments, the compliance manual obligations may be displayed on the graphical user interface discussed further in connection with FIGS. 8-14, and the system may allow the user to download the compliance manual obligations to use as a holistic compliance manual. In other scenarios, it may represent the task text, such as the text used to generate the tasks displayed on graphical user interface depicted in FIG. 9, or any other text used to generate other products in accordance with the present description.

Block 608 represents a combination of the qualitative data from block 607. Thus, block 608 represents the combination of all of the sorted data, the compliance manual obligations, and compiling of all of that data into a single qualitative text. In this example, that represents a Compliance Manual, but may be any number of products in other contexts.

It is important to note that the distinct qualitative data sets described in connection with block 601 can be updated or altered at any time either manually, or via API interface, which will automatically update all downstream processes. In response to the updating of data in block 601, the system would populate any changes to the Taxonomy questions those changes would flow to the user.

Similarly, it is important to note that the Requirements for the user's business, summary text related to the Requirements, instruction language related to the Requirements, and manual text described in connection with block 603 can be likewise updated or altered at any time either manually, or via API interface, which will automatically update all downstream processes. In response to the updating of data in block 603, the system would populate any changes to the qualitative data, or the Compliance Manual Requirements, into the product created at block 608 such that the user is displayed the most recent information.

Figure 7:
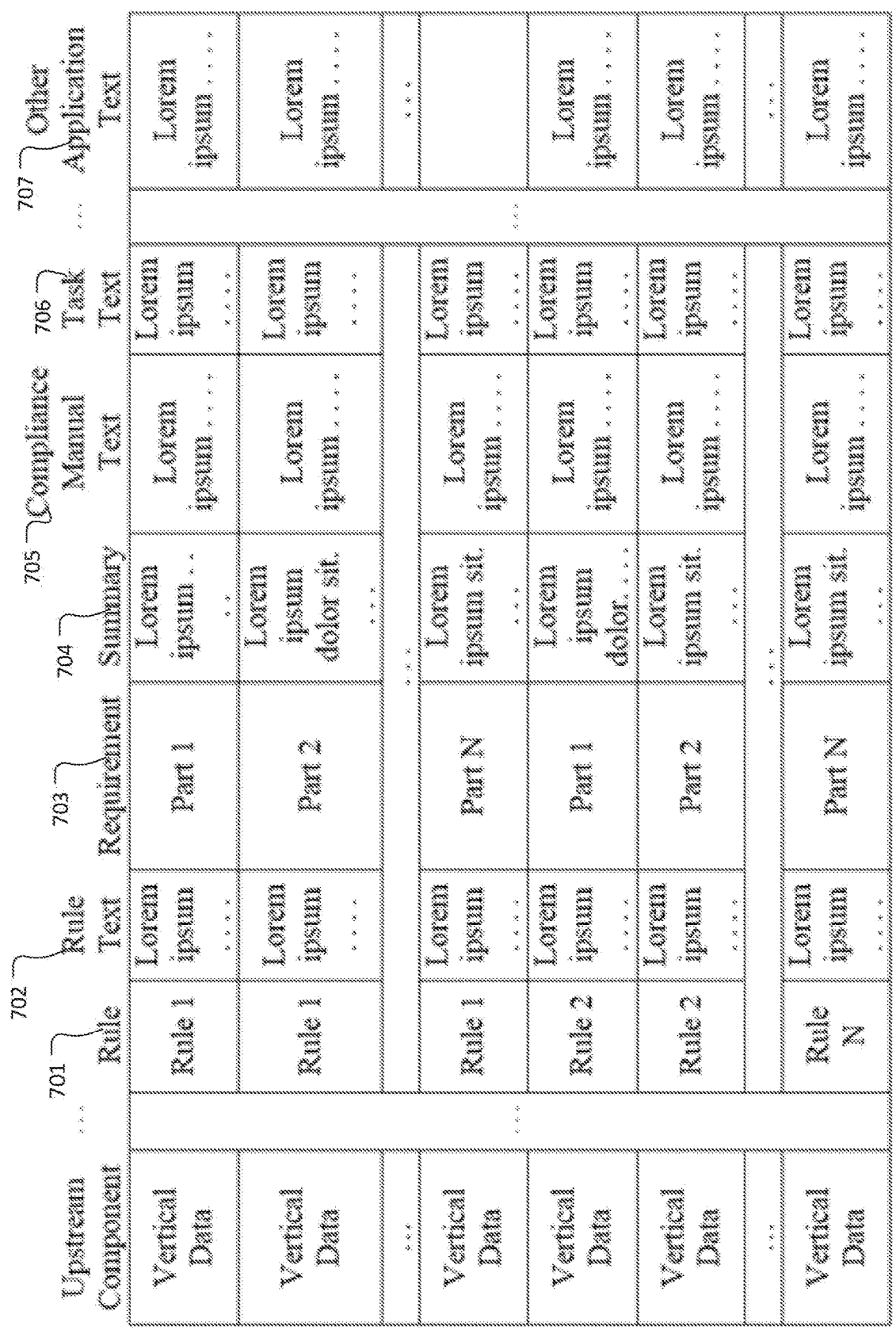
FIG. 7 is a representation of an exemplary data structure for storing granulized data for the processed qualitative data sets.

Referring now to FIG. 7, a representation of an exemplary data structure for storing granulized data for the processed qualitative data is depicted. As described in connection with blocks 502 and 504 of FIG. 5, each granulized part of each rule is stored in a database. As depicted in FIG. 7, the database entry for each granulized part of each rule is associates that part with the rule identification information 701, rule text 702, and the specific requirement part 703 created by the system, such as described in connection with block 502 of FIG. 5. For each requirement part 703, a summary is provided that explains the relevant requirement part 703 at a high or user-friendly level. Similarly, the system may associate a number of textual strings or summaries that the system may pull from when dynamically creating relevant products. For example, for each requirement part 703 of each rule 701, the system may store compliance manual text 705 and task text 706, as well as any number of textual representations 707 for other application. Each of these texts are designed to facilitate the dynamic creation of the relevant product by providing, for example, the description of the compliance requirements or tasks that must be undertaken by the user to satisfy regulatory requirements.

Figure 8:
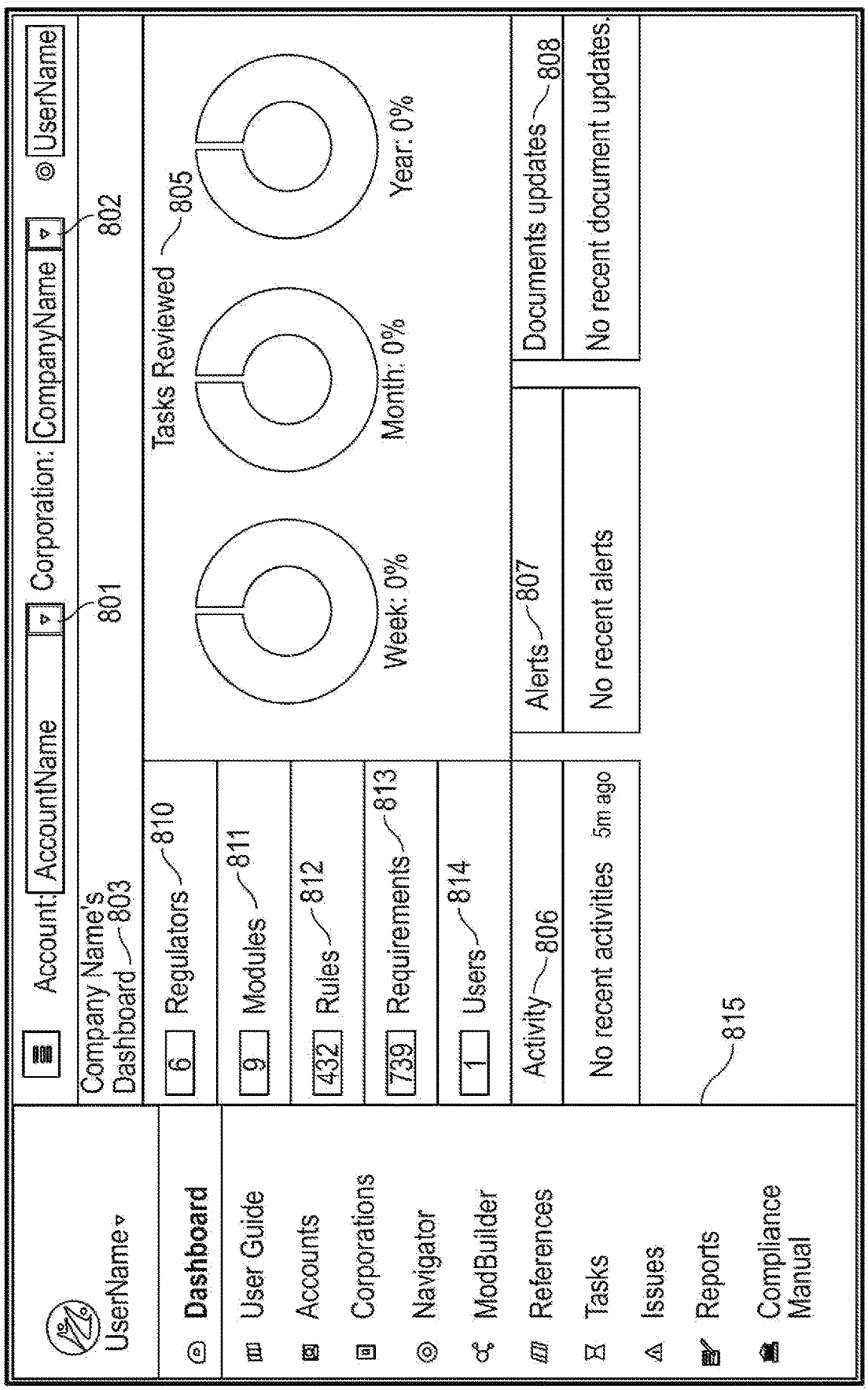
FIG. 8 is an exemplary display for implementing a graphical user interface according to certain embodiments that displays a dashboard summary of activity related to a particular business or user.

Referring now to FIG. 8, an exemplary display for implementing a graphical user interface according to certain embodiments that displays a dashboard summary of activity related to a particular business or user. The dashboard display of the embodiment depicted in FIG. 8 displays the company's name 803 alongside a summary of the number of regulatory bodies 804 implicated by the business's operational data, the number of distinct modules of regulations

811 implicated by the business's operational data, the number of distinct rules 811 implicated by the business's operational data, the number of requirements 813 that the system identified as implicated by the business's operational data, and the number of users 814 that are associated with the company's account. The dashboard display may also contain other visual elements that provide a graphical representation of the outstanding tasks 805 and what percentage have been reviewed or addressed within the last week, month, and/or year. In some embodiments, the dashboard will also display a summary of recent activities 806 that the company has completed using the system, a summary of recent alerts 807 that may include alerts on new activities needing to completed, updates or changes to Rules or Requirements that are relevant to the business's operational data, and/or document updates showing, for example, new documents, speeches, or other texts that were published by the regulatory agencies and that are related to Rules or Requirements that the system identified as being implicated by the business's operational data. Clicking on any these visual elements will take the user to the content, such as the regulation itself, the document itself, or the task itself that the team is working on. In some embodiments, the information displayed on the dashboard is updated in real-time as the system identifies additional information related to the business's operational data. Additionally, a user can change their account and/or corporate entity by clicking on the buttons 801 and 802. In some embodiments, clicking on buttons 801 and 802 will change the display to the relevant display for that particular user. For example, a consultant working with multiple parties may switch between companies using button 802, or if the user is part of a holding company, the user may switch between a different corporate entity within that holding company. The dashboard display also displays a list of additional links 815 that allows the user to navigate to additional displays within the system, such as those described further in connection with FIGS. 9-14. Although not depicted, the dashboard display may also display a summary of task information for tasks that are assigned to the particular account identified by 801, such as those tasks assigned to the user, as described further in connection with FIG. 9.

In some embodiments, the dashboard displays the most recent regulatory compliance information tailored to a particular company and that company's operations. The dashboard display allows the company to view tasks identified by the system that need to be completed in order to comply with one or more regulations. In this way, user interface and dashboard provides a central hub where company representative and team members can log on, view outstanding tasks and the progress of those tasks, and navigate to other displays in order to manage the workflow environment, as well as receive valuable information about regulatory issues that may affect their company and the steps needed to be taken to comply with those regulations. Referring now to FIG. 9, an exemplary display for implementing a graphical user interface according to certain embodiments that dynamically displays relevant regulatory task information assembled by the system using the taxonomy is depicted. As shown in FIG. 9, the system may display the regulatory information 901 for each task that identifies the regulating entity (which may be where this subset of the qualitative data 101 was scraped from by the system), the rule number 902, a task description 903, stage 904 describing whether the task is open, closed, or partially complete, notes 905 on the task that have been entered by one or more users associated with the account or corporation, due date 906 for competing the task (which may be assigned by the a user for the corporation or determined by the system based on the information identified in the user's responses to the taxonomy questions), and assignment filed 907 that allows the system (or a user for the corporation) to assign the task to be completed by another user (or to a third party contract or service provider), among other fields. In some embodiments, the data for each of these fields may be dynamically pulled from the system databases (such as the data structure described in connection with FIG. 7) as needed by the system to construct the relevant task list for the particular user. In related embodiments, a tasking algorithm may be used to help generate and organize tasks, such as by considering the hierarchy of Rules, Subjects, Modules, and Category to determine similar tasks and group them together. Additionally, the tasking algorithm may also utilize natural language processing or elastic search to create a keyword score in an effort to clump tasks together based on the number of shared or similar words between the tasks. The algorithm may also group tasks together based on frequency, such as whether they all occur daily, weekly, monthly, or annually. In this way, the system may list tasks on the task page in a specific order in order to assist the user in providing a streamlined approach to reviewing compliance and review, and eliminate duplication of tasking.

As will be apparent to one of ordinary skill in the art, the depicted interface is exemplary and non-limiting and modifications may be made without departing from the spirit and scope of the present disclosure.

In certain embodiments, the task display is the display that provides the information at the core of the system. Other processes described herein facilitate the system taking all of the Rules and Requirements and sorting them based on how a user answers the taxonomy questions to generate the tasks that are displayed on the task display. The task display provides a page for a company to manage many of its daily obligations. The task display also includes a display notification for the RAI 908 of each task that allows the user to monitor how active the regulations related to the task are and links to other services 909. In one embodiment, the magnifying glass button 910 will display details page having the more intricate details of each task, including additional important regulatory text and task background. The triangle button 911 can be used to flags the task an important "issue" that needs to be resolved. The trash icon 912 deletes the Requirement corresponding to the task and may remove it from recurring in the future. Beneficially, the system can intelligently learn from the user's actions associated with each task, such that if certain tasks related to Requirements in a particular Subject, Module, Category, etc., are consistently flagged or deleted by the user for a particular corporation, then the system may determine that those Requirements are or are not applicable to the company. Tasks which are consistently identified as "issues," for example, may be displayed directly on the dashboard display described in connection with FIG. 8, and any update notifications for such task may be displayed with higher priority. Additionally, a user can change their account and/or corporate entity by clicking on the buttons 913 and 914. Clicking on buttons 913 and 914 will change the display to the relevant display for that particular user. For example, a consultant working with multiple parties may switch between companies using button 914, or if the user is part of a holding company, the user may switch between a different corporate entity within that holding company.

The task window also provides the user with information related to the RAI 908 for a particular task. As described herein, the RAI aggregates information related to rules, laws, and regulations, etc., and computes a score or ranking that describes how active each rule, law, or regulation is in the market place. In this way, the system tracks tasks related to a user's business operations and provides a heat map of the activity surrounding relevant rules and regulations. The RAI score can take into account data points, such as enforcement actions, speeches, market commentary, rule publications, advisory notices (of all kinds), and other official regulator data related to the Rule at issue. In essence, the RAI score alerts the business user of how closely the business user should monitor this regulation for changes.

In some embodiments, the RAI is calculated on a "task" level such that there are two Rules relevant to particular task, and each one is independently actively, then an aggregate RAI score would appear next to the task that is representative of the activity in both Rules. In some embodiments, it may be the sum of the RAI for each of the two Rules, although it may also be a weighed composite score. For example, in a preferred embodiment, the system has a set of default multipliers for each Category (or alternatively, each Module or Subject). These multipliers are determined by the system administrator based on the relative importance to a typical business's daily operations. The system may determine the number of documents and item stored in the set of qualitative data that cite to the particular Rule, and apply the Category Multiplier to the total number of documents. As one non-limiting example, the Category for a task may be Enforcement Actions, and the Enforcement Actions may receive a multiplier of 2. The Rule at issue for the user's business may be Rule 2-50, and the system may examine the stored qualitative data and determine that there are five documents reference Rule 2-50. Given the Category Multiplier of 2, then the RAI for Rule 2-50 would be 10. In some embodiments, the system may also implement a time decay procedure for the RAI, such that the system accounts for whether the volatility of a Rule was a one-time occurrence, or whether the Rule changes often and on ongoing basis. In other embodiments, the system may standardize the RAI to another value, such as a rating out of 100. These examples are non-limiting and a person of ordinary skill in the art would recognize that variations may be made without departing from the scope and spirit of the present disclosure. Beneficially, the system also allows the user to subscribe to alerts or update notifications for each Rule, and the user may utilize the RAI displayed on the task window to identify which Rules are most important to that user.

In additional embodiments, the system may utilize a similar process as described for the RAI to compute a risk score that predicts which regulations are highly active and likely to be updated or changed in the future. While the RAI is backwards focused by analyzing the activity within a user's business to generate a heat map, the risk score may provide a similar process but in a prospective, forward-looking manner. For example, in some embodiments, the system circuitry, such as monitoring circuitry, may retrieve and process regulatory compliance data from a number of sources described herein, such as regulatory text changes, enforcement actions, speeches, clarification notices, etc. The AI circuitry uses this information as a training set to predict the likelihood that enforcement actions in a certain area will occur, and/or the likely outcomes of any existing enforcement actions. The system circuitry may use these sources of information as a training set for the natural language processing techniques described herein and use this process to identify key regulatory topics within the documents that are areas of focus for the document (or areas of focus across several documents) to determine that these key regulatory topics may be the subject of a forthcoming enforcement action. The system circuitry can then apply this information to existing business requirements or regulations to determine if any prospective enforcement actions are relevant to a particular user's business operation data. In this way, the system takes the results from the natural language processing and applies them to the existing set of rules and regulations to identify which areas are likely to be active and/or updated in near the future. Beneficially, this feature will allow the system to be predictive of new regulatory compliance requirements before such requirements materialize in a way that was previously unachievable.

Although a number of novel uses are contemplated within the scope and spirit of the present disclosure, in certain embodiments, the system may utilize the risk score to generate one or more components of the graphical interface that allows a user to view, manage, and monitor regulatory compliance requirements. For example, similar to as described in connection with the exemplary display of FIG. 14, the system may display a list of rules or requirements (or other compliance components) that correspond to the user's business operation data. For each rule or requirement, the system may display the corresponding risk score reflecting how likely the rule requirement to be active and/or updated in near the future. The system interface and circuitry may also allow the user to organize the rules and requirements according to their associated risk score, or search the company's obligations based on which obligations have the lowest or highest risk score. The system may also automatically generate reports (or the user may request) summaries of highly active or volatile compliance requirements. In this way, the system provides an ongoing global view of all regulatory risk and compliance requirements in a way that was previously not possible before the present invention. In addition, the system may monitor the sources of regulatory compliance data in real time and continuously (or periodically) update the risk score. The system may utilize this information to generate alarms or notifications for the user when the compliance requirement is likely to change or be updated, thereby allowing the user to monitor compliance in a previously unforeseen way.

Referring now to FIG. 10, an exemplary display for implementing a graphical user interface according to certain embodiments that allows a user to response to questions generated by the system is depicted (referred to here as the Navigator page). As shown in FIG. 10, in some embodiments the questions 1001, 1002, 1003, and 1004 may be displayed in sequential fashion with the system dynamically determining the subsequent question to display in response to the user's initial selections, such as selections 1005 and 1006. Thus, in this example, questions 1003 or 1004 will be displayed once the user selects the answer to questions 1001 or 1002. In this way, the user enters responses to the questions that are intelligently curated based on a prior series of attributes that the system determined about the user using answers 1001 and 1002. Thus, the user's answers to the curated questions elicit user-specific information and the systems back-end architecture, consisting of one or more distributed network servers, processors, and/or databases, utilizes the user's answers and the aforementioned text strings (such as Rules 110 or Requirements 111) that are sorted and classified by the taxonomy in order to intelligently classify regulations as being of specific importance to the user's business. The user's responses to the questions identify aspects of a company's business operations, such as what are the company's primary activities, is the company a financial institution, if so which financial products it is active in, what venues does the company execute trades in, what exchanges are the trades executed on, which assets is the company on, etc. A company's answers to certain questions may elicit new questions that further clarify the company's business operations if the system needs additional information in order to classify one of the Rules or Requirements as applying to that particular user. In this way, the system interface elicits information in a way that allows the system to intelligently classify the company's business operations and identify particular regulatory compliance issues that are likely to be implicated. The system will then assign the Rules and Requirements to the company's account when the system determines that the company operates in a way that is likely to implicate the Rule or Requirement. The system can use this information to automatically generate regulatory compliance information tailored to that company and its business operations on an ongoing basis, as described further in connection with FIGS. 8, 9, and 11-14. If a company needs to update information as the standard business operations change, then the company can utilize the Navigator menu depicted in FIG. 10 to edit, add, or delete selections later. In the embodiment depicted in FIG. 10, the particular display is the main "categorization" page for a company. Additional pages will be particularly tailored for each "sector" of the economy so that the system can intelligently identify more specific aspects of the company's operational data. For example, sectors such as derivatives, securities, aviation, and so forth, will have additional Navigator pages that built down from jurisdiction (i.e., federal, state, county, municipal, etc.) and account for any nuances within that jurisdiction and sector.

In certain embodiments, this data is used by the Taxonomy engine to streamline user workflows described in connection with FIGS. 8, 9, and 11-14. In other words, the user can click on the different options, which will create different custom workflows that tailored to that specific user. As will be apparent to one of ordinary skill in the art, the depicted interface is exemplary and non-limiting and modifications may be made without departing from the spirit and scope of the present disclosure.

Figure 11:
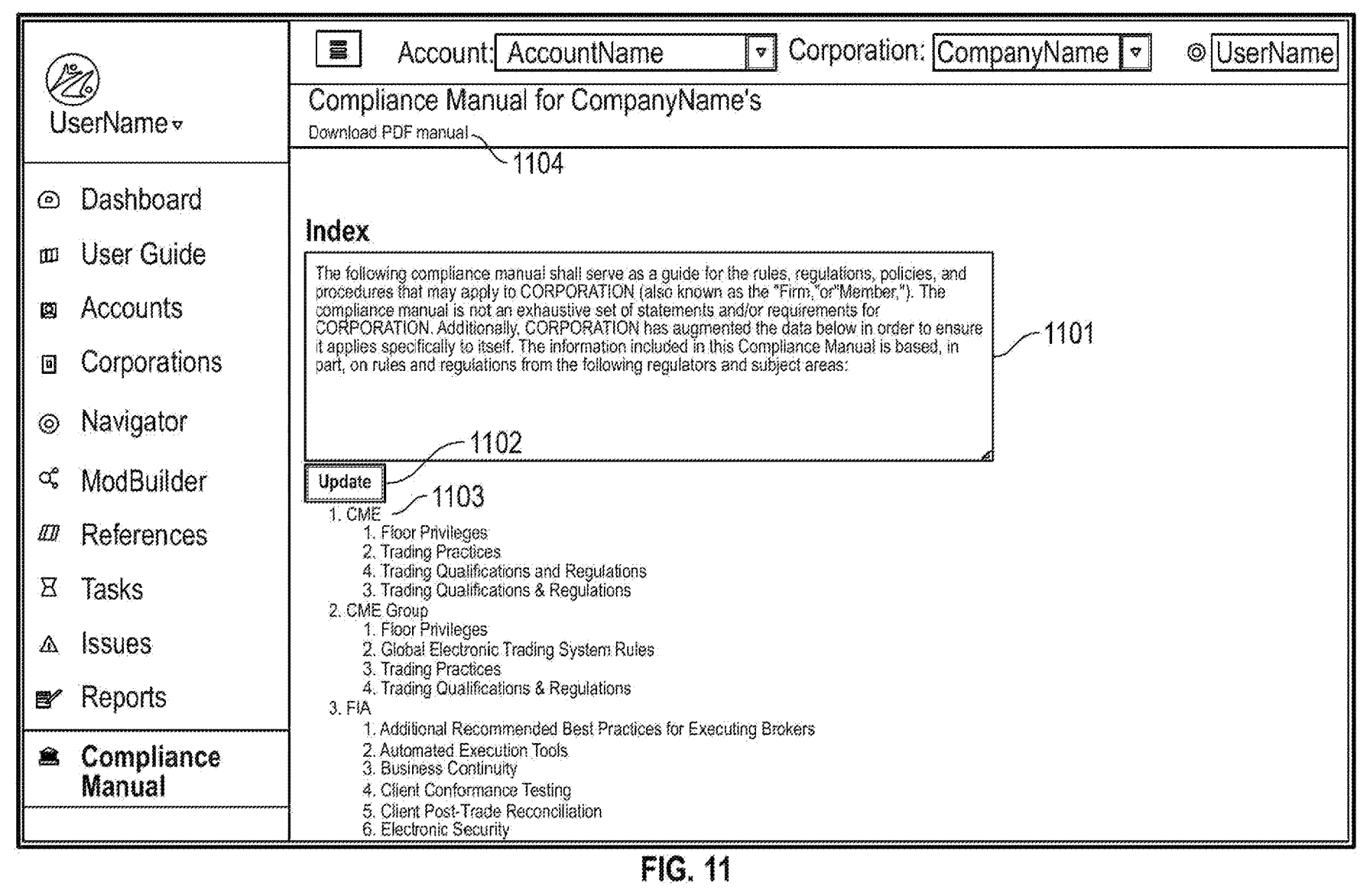

Referring now to FIG. 11, an exemplary display is shown for implementing a graphical user interface according to certain embodiments for generating and updating compliance manuals. The display illustrated in FIG. 11 allows company to automatically build and maintain a compliance manual for their business, such as further described in connection with FIGS. 4 and 6. In some embodiments, the compliance manual generated using this display is based on the Rules and Requirements that the system has determined to related to the business's operational data. The system may further use the display to generate additional content directly to the company's operations that it completes each day. For example, the user may utilize the text entry field 1101 to pull up the current text in a section of the compliance manual and generate additional text and add it to one or more sections of the compliance manual using the update button 1102. The display also displays a series of links as a table of contents tree 1103 that the user may click to bring the user to that section on the page of the compliance manual. The display also allows the user to download the compliance manual as PDF using button 1104, and although not shown, may also allow the user output the compliance manual to a desired format (whether by printing to paper or another digital format, such as an Extensible Markup Language (XML) format) to be distributed to the companies and its employees in order to inform them of any relevant changes that may affect company operations or compliance requirements.

Beneficially, in some embodiments, the system may atomically or periodically generates updated compliance and regulatory information. For example, the data and information that is compiled to create the compliance manual is maintained by the system, and the system may utilize one or more crawlers that recognize when that data is updated or altered at any time either manually, or via API interface. When an update is recognized by the system the system will automatically update all downstream processes that utilize that data. Thus, the Requirements or manual text, summary text, instructional text, etc. that forms part of the compliance manual may automatically be updated and altered in response to new changes to regulations.

Additionally, the compliance manual generated using the display of the embodiment depicted in FIG. 11 may also include portions of the summary text of data described in connection with block 405, the instructional language text described in connection with block 406, and/or compliance manual text described in connection with block 407 of FIG. 4. As described in connection with FIG. 4, the system generates summary text to help convert regulatory text into easy-to-read and easy-to-understand summaries that do not necessarily change the meaning of the regulatory text or provide legal advice, but make the text easier for a user to digest. The system also generates instructional text on what to do in order to comply with a Requirement, which may come from speeches, updates to existing rules, official comments on regulations, etc. The system also generates compliance manual text based on all of the Requirements that apply to a particular user. Compliance manuals generated using the display of FIG. 11 can include data form each of these sources that is aggregated and compiled to form the content accessible using the table of contents tree 1103, and which is ultimately incorporated into the compliance manual when it is exported, such as by using button 1104 to download the manual as a PDF.

Referring now to FIG. 12, an exemplary display is shown for implementing a graphical user interface according to certain embodiments for displaying rules and related documents relevant to a business's operational data. The display illustrated in FIG. 12 allows company view and access all the Rules, Requirements, and/or any corresponding ancillary documents related to the Requirements (i.e. Enforcement Actions, Speeches, Clarification Notices) in a single place within the system. In the example illustrated in FIG. 12, link 1201 allows the user to access all documentation that has been scraped and indexed by the system. Link 1202 allows the user to access all documentation that the system has determined may apply to the user based on the business's operational data and how the user answered the taxonomy questions described in connection with FIG. 10.

Referring now to FIG. 13, an exemplary display is shown for implementing a graphical user interface according to certain embodiments that allows users to track heightened issues. The display illustrated in FIG. 13 allows users to track heightened issues, like complaints or non-compliance issues issued by a user of the account. In some embodiments, the users can also directly email into the system to create a heightened alert that is then displayed on the display for the appropriate company and users. In the embodiment depicted in FIG. 13, three heightened issues are displayed with fields specifying the number 1305 identifying the heightened issue, the issue date 1306 for the heightened issue, the type 1307 of the heightened issue, the assigned user 1308 for the heightened issue, the priority 1309 for the heightened issue (such as whether it's a high, medium, or low priority), and a description 1310 of the heightened issue. Additionally, a report issue button 1304 is provided that navigates to a page where the user can enter information to report additional heightened issues. In certain embodiments, when the user clicks on the issue numbers 1302, 1303, the system will display an additional screen with details for that particular issue number.

Figure 14:
FIG. 14 is an exemplary display for implementing a graphical user interface according to certain embodiments that allows users to generate additional tasks related to the business's operational data.

Referring now to FIG. 14, an exemplary display is shown for implementing a graphical user interface according to certain embodiments that allows users to generate additional tasks related to the business's operational data. The display illustrated in FIG. 14 allows users to create and add additional tasks to the task page that are specific to that company. The mod build page allows the user to utilize the system to create complete workflows that account for idiosyncratic obligations associated with the company's daily business operations. Similar to the task display described in connection with FIG. 9, they system may display the regulatory information 1401 for each task that identifies the regulating entity (which may be where this subset of the qualitative data 101 was scraped from by the system), the RAI value 1402, the rule number 1403, a task description 1404, stage 1405 describing whether the task is open, closed, or partially complete, notes 1406 on the task that have been entered by one or more users associated with the account or corporation, due date 1407 for competing the task (which may be assigned by the a user for the corporation or determined by the system based on the information identified in the user's responses to the taxonomy questions), and assignment filed 1408 that allows the system (or a user for the corporation) to assign the task to be completed by another user (or to a third party contract or service provider), and other fields. In some embodiments, the data for each of these fields may be dynamically pulled from the system databases (such as the data structure described in connection with FIG. 7) as needed by the system to construct the relevant task list for the particular user.

Figure 15:
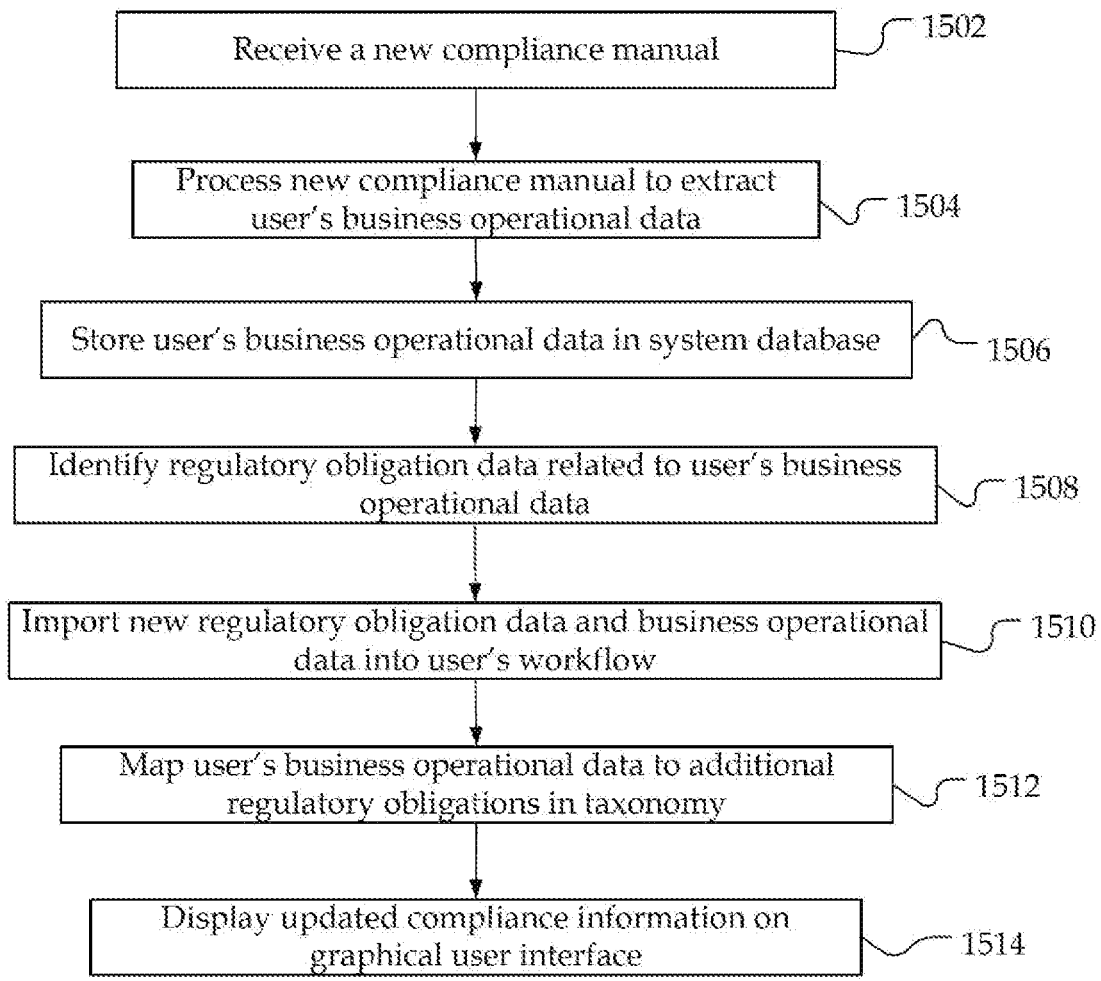
FIG. 15 is a flow diagram of an exemplary method for utilizing the system to receive a user's current compliance manual, extract the user's business operational data, identify regulatory obligations related to the user's business operational data, and import the business operational data and regulatory obligations as part of the user's workflow for display on the graphical user interface.

Referring now to FIG. 15, a flow diagram is shown of an exemplary method for utilizing the system to receive a user's current compliance manual, extract the user's business operational data, identify regulatory obligations related to the user's business operational data, and import the business operational data and regulatory obligations as part of the user's workflow for display on the graphical user interface. Although FIG. 15 is described primarily with respect to a compliance manual, one of skill in the art would recognize that the present system and the method FIG. 15 may also be used with other forms of customer-specific regulatory information, such as policies and procedures documents containing regulatory information for example, without departing from the spirit and scope of the present disclosure. The exemplary method shown in FIG. 15 may be provided as instructions to be implemented by the system hardware and circuitry to allow a user to upload a compliance manual to the system and for the system to process and break down the user's compliance manual in order to both identify current regulatory obligations already present in the compliance manual and to identify new regulatory obligations that are relevant to the user's business that were previously classified and stored in the system's taxonomy.

At step 1502, the system circuitry receives a new compliance manual. In one embodiment, the system may implement a graphical user interface that allows the user to log into his or her account and to upload the user's current compliance manual using a link or button provided on the interface. In other embodiments, the user may send or email the compliance manual to a dedicated address, or the user may provide a link to submit the user's compliance if it is stored at a digital address accessible via the Internet, LAN, or other TCP/IP related protocols that may be available to the system. At step 1504, the system circuitry processes the new compliance manual to extract and classify the user's business operational data. For example, in some embodiments the system circuitry extracts all data from the text of the user's manual. The text may include summary text, clarification data, instruction text, compliance manual text, policy text, and/or other text, similar to as described in connection with FIGS. 4 and 7. The system circuity can compare blocks of extracted to text to similar text already stored the system database to determine what type of text is present in the extracted block (e.g., compare the extracted block of text to currently stored instruction text and compliance manual text and identify if the extracted text is also instruction text or compliance manual text). If the system circuitry is unable to determine what a block of text represents, the system may flag that block of text for further review by the user and/or an administrator to identify the classification of the text. Such flags may be emailed to the user as an alert and also displayed on one or more pages of the graphical user interface as an alert or outstanding task, as described further in connection with FIGS. 8-14.

At step 1506, the system circuitry stores the extracted and classified business operational data in the system's database. In some embodiments, extracted and classified business operational data may be broken down into a data hierarchy as described in connection with FIGS. 1 and 4, and stored in a hierarchical manner similar to other data that was previously processed by the system circuitry. In certain embodiments, the extracted and classified business operational data may be stored in a data structure similar to as described in connection with FIG. 7. In step 1508, the system identifies regulatory obligation data related to the user's business operational data extracted from the compliance manual. In certain embodiments, the system circuitry processes the extracted and classified business operational data to determine whether the data creates an affirmative regulatory obligation. To facilitate this process, the system circuitry may take existing data stored in the system data bases and apply qualitative-based predictive analytics, including by not limited to machine learning, deep learning, transfer learning, or other modern AI based tools to automate the content creation process. The system may also use two or more analytical models and then synthesize the results into a single score or spread in order to improve the accuracy of predictive analytics and data mining applications (e.g., ensemble models). For example, in certain embodiments, the machine learning macro may be based on test data by taking the existing stored data and running a regression model to estimate the relationships among variables. For example, by using 20,000 lines of currently stored data that was initially reviewed and classified by a human administrator, the inventor was able to run a regression model that predicted relationships among text and stored variables with 85% accuracy. In some embodiments, a similar process may be employed to identify regulatory obligation data related to the user's business operational data, although it will be apparent to one of ordinary skill in the art that such a technique is exemplary and that modifications may be made without departing from the spirit and scope of the present disclosure.

At step 1510, the system circuitry imports the identified regulatory obligation data into the user's current workflow. For example, the system circuitry now extracts the identified data that created an affirmative regulatory obligation (which may include elements such as the tasks, rules and requirements as described further in connection with FIGS. 1-7) and updates the user's account workflow to include and reflect the newly identified tasks, rules, and requirements. These newly identified tasks, rules, and requirements may then be displayed on the user's graphical user interface in a similar manner as described in connection with FIGS. 8-14. Some embodiments may include a further shown at step 1512 to identify additional regulatory obligation that may be applicable to the user's business operational data that was extracted and classified from the user's compliance manual. In this way, the system allows the user to upload a current compliance manual for classification and to generate a rule-map from the user's current compliance manual to the rules and obligations stored in the system's database. The user is able to receive and view classified regulatory compliance information with up-to-date information that may potentially be relevant to for the user's compliance manual (including information that may not have been previously included in the user's compliance manual). At step 1512, the system circuitry maps the user's business operational data to additional regulatory compliance information that was previously processed and stored in the system taxonomy/database, as described in connection with FIGS. 1-7. In some embodiments, step 1512 may be involve the system circuitry taking the extracted business operational data comparing it to the current tasks, rules, and regulations already stored in the system database. The system circuitry may identify currently stored tasks, rules, and regulations that have a sufficient similarity to the extracted business operational data to determine that the tasks, rules, and regulations apply to the user's business. In some embodiments, the system is able to leverage the hierarchical data structure to control the mapping and identify a more complete set of tasks, rules, and regulations that apply to the user's business operational data, including new and different regulatory obligations that the user did not previously identify as being related to the user's business. The system can then include the newly identified information the user's compliance manual that was uploaded at step 1502. This ensures that he user's account is associated with the most up-to-date regulatory obligation. In certain embodiments, the user's data-based tasks may be grouped together with the system's data-based tasks (or rules or regulations) so that user's tasks are associated with the currently established data hierarchy described in connection with FIGS. 1-7. This grouping of tasks allows the system to present associated data in an organized format so that the user may quickly review associated tasks (or rules and regulations), for example, on a single page of the graphical user interface. At step 1514, the updated compliance information for the user is displayed on the graphical user interface as part of the user's workflow as described further in connection with FIGS. 8-14, such that the user's most recent regulatory obligation data (and any newly identified regulatory obligation data that was not already present in the user's compliance manual) is displayed and tracked by the system. The user may then utilize the other system functionality to track and manage regulatory tasks, or use system functions to create, generate, or assemble a new compliance manual reflecting the most recent and updated information. The new compliance manual can be delivered to the user using the methods and features previously described herein.

Figure 16:
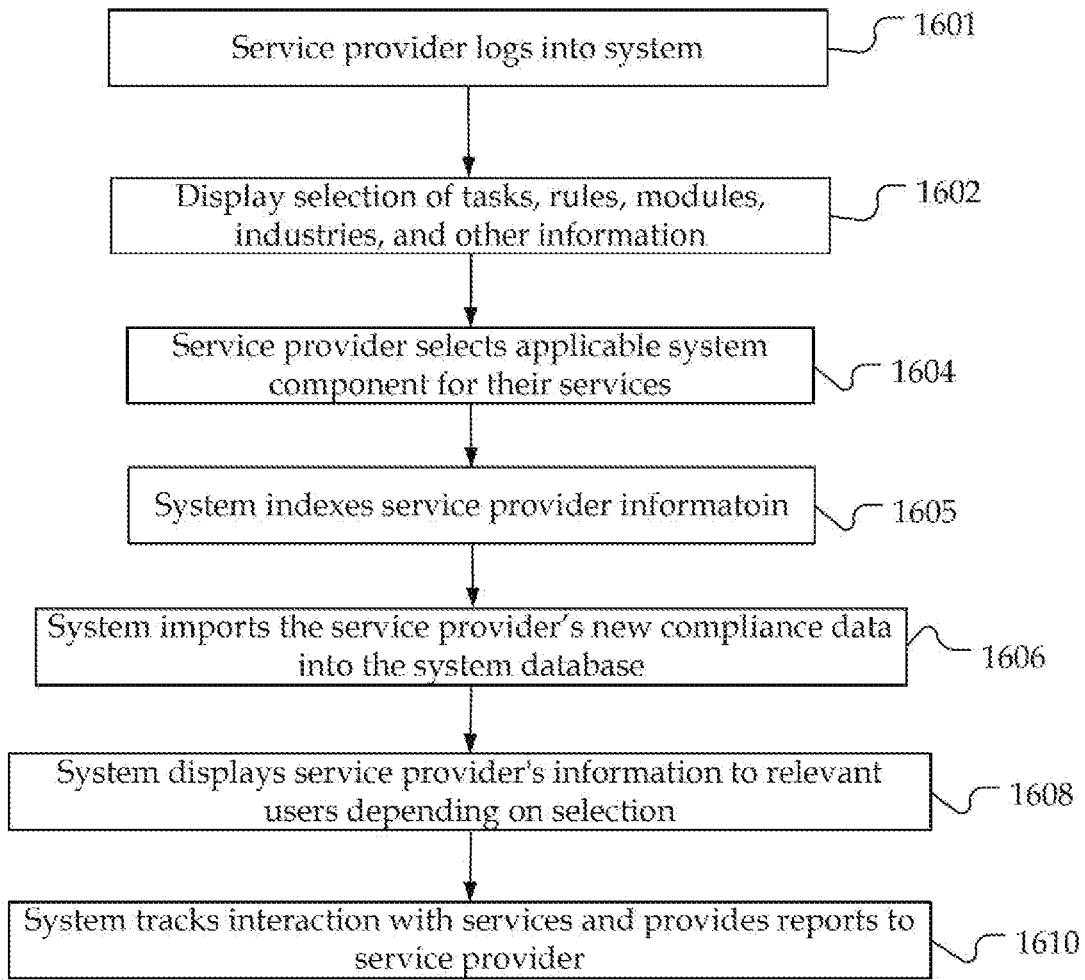
FIG. 16 is a flow diagram of an exemplary method for utilizing the system to implement an interface that allows service providers to access they system and provide regulatory services to users.

Referring now to FIG. 16, a flow diagram is shown of an exemplary method for utilizing the system to implement an interface that allows service providers to access the system and have the service provider's regulatory compliance data indexed in accordance with the system's hierarchical taxonomy and associated database structures as described in connection with FIGS. 1-7. Although a number of uses are envisioned, the indexing of the regulatory service provider's regulatory compliance data in accordance with the system's hierarchical taxonomy and associated database structures allows the service provider to import additional qualitative and quantitative compliance information into the system such that the information may be indexed in accordance with the information described herein. Additionally, the service provider may offer professional services related to certain aspects of the regulatory compliance obligations. In such a case, the service provider may use the same system functionality, such as an API or graphical interface, to index the service provider's available services with specific rules or tasks within the system's hierarchical database, such that the services may be linked to specific rules or tasks. One beneficial feature of these embodiments is to allow the imported regulatory compliance data or the indexed services to be provided to the user alongside the associated rules or tasks. For example, the imported regulatory compliance data and the indexed services may be displayed on the graphical interface alongside the display of the associated rules or tasks, or may be included in a user's compliance manual along with the associated rules or tasks when relevant to the user's business operational data.

In one exemplary embodiment, the third-party service providers may be a cyber-security expert, compliance training professional, accounting auditor, or daily capital requirement calculator, and the like. Each respective service provider can utilize this method to tie their financial and compliance services into the hierarchical system via the API. In this example, the cyber security expert's, compliance training professional's, accounting auditor's, or daily capital requirement calculator's available services will be imported and associated with specific rules or tasks within the system's hierarchical database. The system can then display the cyber security expert's, compliance training professional's, accounting auditor's, or daily capital requirement calculator's available services alongside the specific rules or tasks when those rules or tasks are displayed on the graphical user interface or included in a compliance manual, as described further in connection with FIGS. 8-15.

However, as mentioned, additional uses of the service provider API are also envisioned within the spirit and scope of the present disclosure, such using the API to allow the system to gather regulatory compliance information from service provides and to use this data to supplement the existing hierarchical database. In further embodiments yet, the system may also provide reports to the third-party service providers for a number of reasons, such as informing the service provider when the user views or clicks on the provider's services. Thus, one of skill in the art would recognize that this process may be used as part of a monetary scheme, whether advertisement based or a back-end charge for allowing service providers to access the system API and associate their services with various rules or tasks.

Referring back to exemplary method depicted in FIG. 16, at step 1601, the service provider accesses a system interface to log into the system. At step 1602, the system interface displays a series of components from the hierarchical database on the graphical interface, so that the service provider may select which component their service applies to. For example, this display options may include options to identify the service provide as a Regulator and/or as providing compliance data on a particular Module, Subject, Rule, Task, Regulator, Industry/Sector, and/or Jurisdiction, as described further in connection with FIGS. 1-7. At step 1604, the service provider selects which Module, Subject, Rule, Task, Regulator, Industry/Sector, and/or Jurisdiction they are interested in providing service information for. At step 1605, the system circuitry then indexes the service provider's service information. In one embodiment, the system circuitry may determine a number of data fields associated with the particular Module, Subject, Rule, Task, Regulator, Industry/Sector, and/or Jurisdiction, such as those described in the hierarchical database discussed further in connection with FIGS. 1-7. The system circuitry may then display a form in response to the user selecting the particular Module, Subject, Rule, Task, Regulator, Industry/Sector, and/or Jurisdiction they are interested during step 1604. The form may be designed to elicit the relevant information for the selected Module, Subject, Rule, Task, Regulator, Industry/Sector, and/or Jurisdiction (e.g. using text boxes). Such relevant information may include the different fields that are stored in the hierarchical database for that particular category of information. The system may then use an API function to index the information the service provider input into the form by associating the information entered into each text box with the relevant data fields from the database. In other embodiments, the system may index the service provider's information based the text entered by the user into the form or text box field. For example, the one or more semantic or natural language processing techniques, as described further herein, may be used to identify key terms or phrases within the service provider's information and match those phrases to particular Modules, Subjects, Rules, Tasks, Regulators, Industries/Sectors, and/or Jurisdictions. At step 1606, the system imports the service provider's service information into the system database and associates it with the selected Module, Subject, Rule, Task, Regulator, Industry/Sector, and/or Jurisdiction (or other regulatory compliance data as the case may be) already stored in the database.

At step 1608, when a user is utilizing the system as described in connection with FIGS. 8-14, the system displays the information provided by the service provider on the graphical user interface when it is determined to be relevant to the user's business operational data or the current task that the user is monitoring. For example, if the user is viewing compliance data for the selected Module, Subject, Rule, or Task, the system may display information from one or more service provides on the same page. Some embodiments may implement a further step at 1610. At step 1610, the system circuitry may allow the service provide track and/or monitor interaction with the service provider's service information. In certain embodiments, the system may automatically generate an alert when the user interacts with the service provider's new compliance data or user is at risk of violating a regulatory compliance obligation associated with the service provider. In other embodiments, the system may automatically generate a report that contains a detailed breakdown of display information, the number of views or impressions of each service provider's data, the number of user interactions or click-through for each service provider's data, and so forth. The system may also implement a graphical user interface that provides a portal for the service provider to log in and track such impression and click-through information for one or more users, or categories of users. Additionally, the system may also allow the user to report compliance data directly to the service provider via the systems API functionality.

In additional embodiments, the system circuitry may implement a feature for automatically creating regulatory reports that are targeted to the particular user, or a topic selected by the user, using the system taxonomy. For example, the user's business may be governed by a particular regulatory body and the user may utilize the system interface to generate reports that are specific to that regulatory body. As part of this process, the user may utilize the system interface to select a particular topic it is interested in and then select an interface element to dynamically create a report detailing the relevant compliance data related to that topic, or to sign up for alerts related to that topic. The system circuitry will then take in the user's operational data as an input and utilize the system's taxonomy related to the identified topic to generate a report summarizing the user's operational data as it relates the particular topic at hand. By way of example, the user may be interested in generating a report related to margin data on the Chicago Mercantile Exchange (CME). As described in connection with FIG. 1, the system taxonomy may have a module of data for the relevant CME qualitative or quantitative rules and requirements. The user may therefore utilize the interface to select a report for the CME related to margins and the system will dynamically apply the user's operation data to the qualitative or quantitative rules stored in the taxonomy to generate a report. Similarly, in another example, the user may be interested in generating a report related to employee training requirements and the current status of its employees' compliance with those requirements. Because the training requirements can be stored as a module of qualitative and quantitative rules by the taxonomy, then the system may generate a report or summary related to the current standing of the user's employee base. As will be apparent to one of ordinary skill in the art, these examples are non-limiting and additional reports of any nature may be implemented so long as there is a corresponding module of qualitative or quantitative rules that have been classified by the taxonomy. Each of these types of reports is intended to be within the spirit and scope of the present disclosure.

Figure 17:
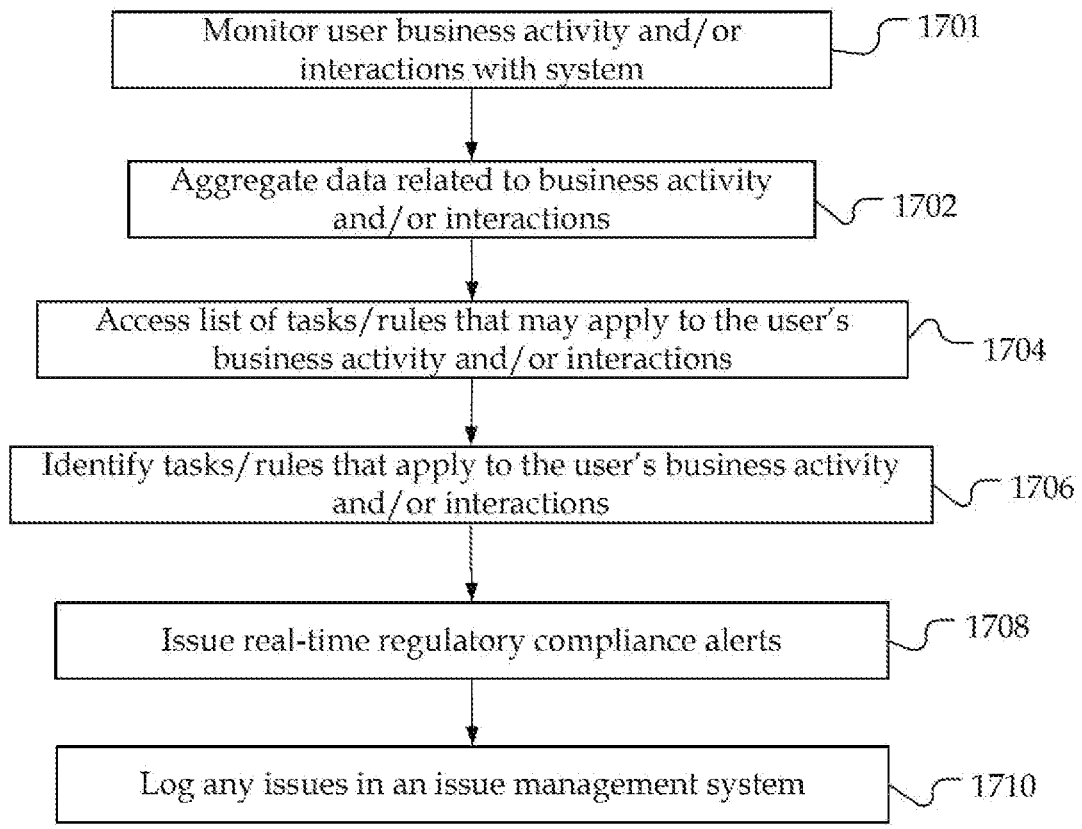
FIG. 17 is a flow diagram of an exemplary method for utilizing the system to implement real-time regulatory compliance alerts.

Referring now to FIG. 17, a flow diagram is shown of an exemplary method for utilizing the system to implement real-time regulatory compliance alerts based on a user's interactions with the system. In some embodiments, the system may implement a background process that runs on the business user's system and monitor's the user's employee's activities to generate real-time regulatory compliance alerts. For example, in certain embodiments the system may monitor a user's interactions and activities (e.g., email text, chats, keystrokes, voice-conversations that are converted to text, or any other type of data that can be ingested into the system) and compare the interactions and activities with a regulatory data set to determine which regulations are implicated by that user's business activities. This allows the system to create a real-time surveillance of the user's business activities to determine in real-time which regulatory obligations are particularly applicable to the user's business. The system may use this information in a number of ways, including without limitation, to generate alerts when a user's employee may be about to (or are) violating a regulatory obligation, to generate alerts when regulations that are particularly applicable to the user's daily activities change, or to generate alerts when new regulations issue that are applicable to the user's activity. In this way, a user can leverage the system's hierarchical data system to implement real-time regulatory compliance alerts.

In some embodiments, prior to utilizing the method shown in FIG. 17, the user must agree to terms of service or a waiver that allows the system to monitor and record its activity in real-time. In other embodiments, the system may monitor only a user's interactions with the system interface described in connection with FIGS. 8-14 to issue real-time regulatory compliance alerts in a similar fashion.

Referring now to the exemplary method shown in FIG. 17, at step 1701, the system monitors the user's business activity and/or the user's interactions with the system interface. For example, the certain embodiments the system may contain one or more processors or circuit components of one or more distributed computers, servers, or databases, that, in conjunction, are configured to execute instructions to monitor a number of sources of user interactions with the system, including but not limited to email text, chats, keystrokes, mouse clicks, voice-conversations that are converted to text, interactions with the system interface, and/or any internet of things data of any kind that can be used by the system to ingest data related to the user's business activities. At step 1702, the system circuitry, such as monitoring circuitry, receives and aggregates the ingested data user's business activity and/or the user's interactions with the system interface. At step 1704, the system circuitry accesses a list of tasks, rules, and/or requirements (as described further in connection with FIGS. 1-8) that may apply to the user's business activity and/or the user's interactions with the system interface. This step may also include aggregating any "custom tasks" that the user input into the system as well.

At step 1706, the system circuity, such as comparison circuitry, identifies which of the tasks, rules, and/or requirements apply to the user's business activity and/or the user's interactions with the system interface. For example, in some embodiments the system will compare the user's business activity and/or the user's interactions with the system interface to identify in real-time whether any of the user's employees engaging in conduct that is likely to or about to violate a regulatory obligation, or if the user's employees are engaging in conduct that is already in violation of a regulatory obligation. In certain embodiments, the system may use qualitative-based predictive analytics to determine when the user's employees engaging in conduct that is likely to or about to violate a regulatory obligation, such as machine learning, deep learning, transfer learning, or other modern AI based tools to automate the content creation process, or using two or more analytical models and then synthesizing the results into a single score or spread in order to improve the accuracy of predictive analytics and data mining applications (e.g., ensemble models). In a non-limiting example, an initial data set can be gathered that includes information on keystrokes and interactions with the system, and a human administrator can review the initial data set to associate the keystrokes and interactions with particular bodies of text, such as the tasks or rules or other regulatory compliance data. Once a sufficient set of data is associated with the tasks or rules, the system may utilize this initial data set as a training set and use predictive analysis to estimate when a particular keystroke or interaction may violate the particular regulatory policy that is embodied in the text.

At step 1708, the system circuitry, such as alert circuitry, issues a real-time regulatory compliance alert. A number of methods for issuing the regulatory compliance alert are envisioned, including, for example, an email notification, a pop-up warning, an alert displayed on the graphical user interface as described in connection with FIG. 8, provide a warning to a company via an API, and so forth. It will be apparent to one of ordinary skill in the art that such techniques are exemplary and that they may be combined or modifications may be made without departing from the spirit and scope of the present disclosure. For example, the alert or system circuity may generate alerts when regulations that are particularly applicable to the user's monitored activities change, or new regulations issue that are applicable to the user's monitored activity. These processes may leverage the technology and heat maps as previously described in connection with the RAI score discussed further in connection with FIGS. 1-14. Some embodiments may also implement an additional step at step 1710. At step 1710, the system circuitry, such as log circuitry, may also log any regulatory compliance issues in an issue management system that stores and tracks data related to compliance with regulatory obligations and a log of any potential or actual violations of regulatory compliance obligations.

Although not shown, related embodiments may also provide a graphical interface that allows users to comment on potential actions or current events, such as regulations that are being considered by regulatory agencies. The system may parse proposed rules for agencies in a similar manner as the active rules, but instead of introducing those rule into the qualitative data set used for generating Requirements, the system may maintain those proposed rules in a separate module that allows users to review the rules and comment on the potential actions. User comments can be aggregated by the system and automatically submitted to the regulatory agency, such as via API into the agency's website.

Although not shown, additional embodiments may also provide an interface that allows users to generate and view information summarizing compliance requirements for similar rules or regulations across multiple regulatory bodies and/or jurisdictions. As described further in connection with the various processes and features described for FIGS. 1-17, the system includes monitoring circuitry that receives compliance-related information from multiple regulatory bodies and/or jurisdictions. The system circuitry, such as the taxonomy engine 204, processes the rules and regulations from multiple jurisdictions and breaks those regulations down into their constituent parts, such as the qualitative and quantitative components described further in connection with FIGS. 1-7, which are then stored in the system databases. Once the rules and regulations for various jurisdictions have been processed, such as according the methods and processes described further in connection with FIGS. 1-7, the system circuitry may then implement an additional process to generate a similarity score. In certain embodiments, in order to generate the similarity score, the system circuitry and processors takes a set of qualitative and quantitative requirements in one jurisdiction (which may be stored as a first module of data) and compares it to the set of qualitative and quantitative requirements in a second jurisdiction (which may likewise be stored as a second module of data). The system may likewise compare the qualitative and quantitative requirements in the first two modules to any number of additional modules in a similar manner. The system circuitry processes the entire set of data using the natural language processing techniques described herein to identify, in each of the modules, requirements or content having similar pairs of semantic relationships. For example, in one embodiment the system may use natural language processing techniques described herein to identify noun/verb relationships (as well as other grammatical relationships) that are similar within each module. The system circuitry may also identify which requirements in the modules have distinct or unique asset components. In certain embodiments, the system includes scoring circuitry that then uses the identified relationships to generate a semantic similarity score reflecting the degree of similarity (or difference) in the relationship pairs from one module to the next, and also identifies the distinct or unique assets components in each module. Using the similarity score, the system's interface circuitry may then group particular requirements from the various modules that have a similarity score indicating a sufficient degree of similarity between the requirements in two jurisdictions. Once similar requirements from each jurisdiction are grouped according to these methods, the system interface circuitry may then aggregate the various remaining requirements to generate a new list of compliance requirements covering the individual requirements from all jurisdictions or evaluated modules.

Beneficially, the system circuitry can utilize this process to generate a single of set of requirements that a user may follow in order to satisfy or comply with the compliance requirements in all of the analyzed jurisdictions or modules. In an additional novel and previously unachievable aspect, the system may also utilize the knowledge base and training set to generate new compliance steps that may be different from any of the individual compliance requirements in a single jurisdiction, but that, if followed, would satisfy two or more compliance requirements from differing jurisdictions or modules. In this way, the system generates a new and more efficient compliance process in a way that was previously unachievable, thereby saving significant time and resources. Likewise, the system may utilize the compiled list of requirements to conduct an automated gap analysis for a user's existing business practices or compliance framework, such as the user's compliance manual, operating standards, best practices guidelines, or similar body of compliance requirements. For example, similar to as described further in connection FIG. 15, the system circuitry may include gap-analysis circuitry that receives and processes a user's compliance manual, operating standards, best practices guidelines, or similar compliance framework to identify the user's current set of compliance information. Once identified, the system circuitry can compare the relevant compliance requirements from the user's compliance information to the set of compliance requirements generated by the system when employing the previously described processes. The system circuitry may then generate a summary of compliance requirements that are missing from the user's current business practices or standards. The interface circuitry may display on the summary on the user interface, generate a report, or the system circuitry may issue real-time alerts and notifications indicating that the user is missing compliance requirements that are implicated by their business operations.

In alternative contemplated embodiments, once the initial similarity score is generated, the system may consider a number of factors in order to adjust the magnitude of the initial similarity score. For example, the score may be increased or otherwise adjusted by a factor that reflects how many distinct types of grammatical relationships there are between the same two module sets, or how frequent each particular grammatical relationship is found in the two module sets. The system may also consider additional information to identify whether the particular difference between to the two module sets is a relatively major and minor compliance requirement, such as how often the particular business or compliance requirement is subject to an enforcement action or whether the requirement is directly related to one or more aspects or components of the particular user's business operation data. The system may also consider any of the other types of information described herein and generated by the system, and which may help assess how important the particular business or compliance requirement is to a particular user's operational data and adjust the similarity score accordingly to ensure that important compliance requirements are included.

In additional embodiments, the system may utilize a composite similarity score as a quantitative measurement of how similar the business or compliance requirements in two different jurisdictions are, and, optionally, provide a summary of the major differences with respect to specific compliance risks faced in each jurisdiction, actions in each jurisdiction, or compliance requirements for operating in one jurisdiction versus another. By comparing differences between the two jurisdictions, and accounting for whether the particular difference is a relatively major and minor business or compliance requirement, the generated similarity score will be indicative of the number and magnitude of differences between the jurisdictions. As a non-limiting example, the system may also generate a physical display of the similarity score and/or the differences between each jurisdiction, such as list, data graph or cluster representation.

In addition to aforementioned processes, the system circuitry may also implement a new and novel process for automatically generating proposed and/or model regulatory text. This new and unique process realizes previously unforeseen benefits by allowing aspects of the system to proactively generate new regulatory and compliance-related text based on identified relationships between existing laws and existing regulations. In some embodiments, the system circuitry may implement this feature by retrieving data related to existing laws and regulations from numerous sources, such as published legal text, issued or proposed changes to laws, best practice publications, standards, issued regulatory text or proposed changes, enforcement actions, speeches, clarification notices, etc. Once the initial set of information is gathered, the system circuitry processes this information to identify and extract component information from the legal and regulatory-related texts relating to, for example, entities, topics, verbs, artifacts, dates, obligations, rules, requirements, and other natural language concepts described herein. In some instances, portions of this information may have been retrieved and processed during implementation of the other system features and processes described herein, such as the processes described in connection with FIGS. 1-7. Once processed, the system circuitry may then apply the natural language processing techniques described herein to the processed data in order to generate a mapping of relationship pairs between corresponding elements found in the existing laws and existing regulations. The relationship pairs may, for example, analyze particular portion or components of existing laws and identify the corresponding compliance requirement found in existing regulatory-related texts. In this way, the system circuitry can identify paired relationships between requirements (or other components) found in existing laws and the corresponding regulatory-related text for those requirements (or other components) found in existing regulations. The system circuitry then uses the machine learning techniques described herein to generate an initial model that is trained using the mapping of paired relationships between existing laws and existing regulations. Once trained, the system circuitry may apply the trained model to newly issued laws in order to generate proposed or model regulatory text for those laws. Although a number of novel uses are contemplated within the scope and spirit of the present disclosure, in certain embodiments, the proposed or model regulatory text can be utilized to, for example, generate best practices guidelines for firms, write model regulations for trade associations, write operating standards for industries, or even create an entire model regulatory framework for previously unregulated industries.

Although much of the present disclosure is described in connection with regulatory compliance data, it will be apparent to one of skill in the art upon reading the present disclosure that the present methods and systems can be applied additional areas (or sets of qualitative content data) as well. By way of example, a similar process can be adapted to apply to legal bodies of text, such as the United States Code, Code of Federal Regulations, Federal Register, or other related texts of regulatory agencies, such as the Patent and Trademark Office or International Trade Commission. In these instances, the taxonomy classification system may be adapted to take in the body of applicable regulations as a set of qualitative content data and parse it using the process described in connection with FIG. 1 to create a similar hierarchy structure for that particular area of law. For example, the Code of Federal Regulations (CFRs) may be analyzed and broken down to identify requirements within each CFR as well as identify relationships between particular CFRs, or relationships between entire modules of related regulations within the CFRs. In this way, the system circuitry may create a map-like structure of the CFRs that contains all of the qualitative and quantitative requirements as well as a series of links that identify relationships between each CFR and/or qualitative and quantitative requirements within the particular CFRs or modules. This same process can be applied to any type of body of applicable regulations with only minimal adaptions required to account for the particular structure of the body of applicable regulations at hand.

Note that various applications in accordance with the present description may include the apparatus and systems of various embodiments can broadly include a variety of electronic and computer systems. In particular, each and every operation described herein may implemented by corresponding hardware and circuitry. For example, each and every operation may have its own dedicated circuitry, such as may be implemented using a programmable logic array (PLA), application-specific integrated circuit (ASIC), or one or more programmed microprocessors. In some embodiments, each of the operation may be performed by system logic that may include a software controlled microprocessor, discrete logic, such as an ASIC, a programmable/programmed logic device, memory device containing instructions, a combinational logic embodied in hardware, or any combination thereof. Accordingly, logic may be fully embodied as software, firmware, or hardware. Other embodiments may utilize computer programs, instructions, or software code stored on a non-transitory computer-readable storage medium that runs on one or more processors or system circuitry of one or more distributed servers and databases. Thus, each of the various features of the operations described in connection with the embodiments of FIGS. 1-17 may be implemented by one or more processors or circuit components of one or more distributed computers, servers, or databases, that, in conjunction, are configured to execute instructions to perform the function by executing an algorithm in accordance with any steps, flow diagrams, drawings, illustrations, and corresponding description thereof, described herein.

The aforementioned servers and databases may be implemented through a computing device. A computing device may be capable of sending or receiving signals, such as over a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include a central processing unit and memory. A server may also include a mass storage device, a power supply, wired and wireless network interfaces, input/output interfaces, and/or an operating system, such as Windows Server, Mac OS X, UNIX, Linux, FreeBSD, or the like. Devices for accessing the system interfaces may include, for example, a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the foregoing devices, or the like.

While the computer-readable medium as described or set forth in the appended claim may be described as a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The "computer-readable medium" may be non-transitory, and may be tangible.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. For example, features described in connection with one embodiment may be used or employed by another embodiment. Likewise, other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An artificially intelligent system employing modularized and taxonomy-based classifications to generate compliance-related content, comprising:
    monitoring circuitry that receives regulatory compliance data from one or more published regulatory texts;
    a taxonomy engine that processes the regulatory compliance data to generate taxonomy-based classifications of the regulatory compliance data, the taxonomy-based classifications comprising a plurality of modules and compliance requirements within each module;
    one or more databases storing the taxonomy-based classifications of the regulatory compliance data;
    a processor, in operative communication with the database, that receives at least two of the plurality of modules from the taxonomy-based classifications and processes the compliance requirements within each received module using one or more artificially intelligent processes by mapping semantic relationship pairs between received modules;
    scoring circuitry that:
        (1) produces a respective similarity score for one or more mapped semantic relationship pairs between received modules; and
        (2) uses the one or more respective similarity scores to generate a set of compliance steps covering compliance requirements from each of the received modules, wherein:
            (a) the scoring circuitry uses the similarity scores to identify differences between the mapped semantic relationship pairs;
            (b) the scoring circuitry uses the identified differences to generate an updated set of compliance steps; and
            (c) the scoring circuitry further stores the updated set of compliance steps, and
    gap-analysis circuitry that receives and processes a user's existing compliance framework to identify compliance requirements that are missing from the user's existing compliance framework based on the updated set of compliance steps.

2. The artificially intelligent system of claim 1, wherein the received at least two of the plurality of modules from the taxonomy-based classifications comprise a first module of compliance requirements generated from published legal text and second module of compliance requirements generated from published regulatory-related text.

3. The artificially intelligent system of claim 2, wherein processing the compliance requirements within each received module using one or more artificially intelligent processes by mapping the semantic relationship pairs between received modules comprises:
    processing the compliance requirements within each received module using natural language processing to identify compliance requirements in the first module of compliance requirements generated from published legal text that correspond to compliance requirements in the second module of compliance requirements generated from regulatory-related text.

4. The artificially intelligent system of claim 1, wherein mapping the semantic relationship pairs between received modules comprises mapping the semantic relationship pairs between each received module to use as a training set to train the one or more artificially intelligent processes.

5. The artificially intelligent system of claim 4, wherein the processor is further configured to apply the trained one or more artificially intelligent processes to newly issued laws to generate proposed or model regulatory text for the newly issued laws.

6. The artificially intelligent system of claim 1, wherein the set of compliance steps includes steps for complying with a plurality of system-generated requirements that are different from any of the compliance requirements within the received modules.

7. The artificially intelligent system of claim 6, wherein the plurality of system-generated requirements comprises steps that cover at least two distinct compliance requirements from within the received modules.

8. The artificially intelligent system of claim 1, wherein the receiving and processing of the user's existing compliance framework to identify compliance requirements that are missing comprises:
    receiving the user's current compliance manual, operating standards, or best practices guidelines;
    processing the user's current compliance manual, operating standards, or best practices guidelines to identify a set of current compliance requirements for the user;
    comparing the set of current compliance requirements for the user to the compliance requirements within each of the plurality of modules of the taxonomy-based classifications of regulatory compliance data; and
    identifying a set of missing compliance requirements from the plurality of modules of the taxonomy-based classifications of regulatory compliance data.

9. The artificially intelligent system of claim 8, further comprising interface circuitry configured to display a summary of the set of missing compliance requirements on a graphical user interface.

10. The artificially intelligent system of claim 8, further comprising system circuitry configured to issue an alert to the user when there are one or more compliance requirements in the set of missing compliance requirements.

11. An artificially intelligent system employing modularized and taxonomy-based classifications to generate compliance-related content, comprising:
    one or more databases;
    an electronic device coupled with a display, the electronic device having memory storing one or more programs executable by the electronic device, the one or more programs including instructions for:

monitoring circuitry that receives regulatory compliance data from one or more published regulatory texts;

a taxonomy engine that processes the regulatory compliance data to generate taxonomy-based classifications of the regulatory compliance data, the taxonomy-based classifications comprising a plurality of modules and compliance requirements within each module;

one or more databases storing the taxonomy-based classifications of the regulatory compliance data;

a processor, in operative communication with the database, that receives at least two of the plurality of modules from the taxonomy-based classifications and processes the compliance requirements within each received module using one or more artificially intelligent processes by mapping semantic relationship pairs between received modules;

scoring circuitry that:
(1) produces a respective similarity score for one or more mapped semantic relationship pairs between received modules; and
(2) uses the one or more respective similarity scores to generate a set of compliance steps covering compliance requirements from each of the received modules, wherein:
  (a) the scoring circuitry uses the similarity scores to identify differences between the mapped semantic relationship pairs;
  (b) the scoring circuitry uses the identified differences to generate an updated set of compliance steps; and
  (c) the scoring circuitry further stores the updated set of compliance steps, and gap-analysis circuitry that receives and processes a user's existing compliance framework to identify compliance requirements that are missing from the user's existing compliance framework based on the updated set of compliance steps.

12. The artificially intelligent system of claim 11, wherein the received at least two of the plurality of modules from the taxonomy-based classifications comprise a first module of compliance requirements generated from published legal text and second module of compliance requirements generated from published regulatory-related text.

13. The artificially intelligent system of claim 12, wherein mapping the semantic relationship pairs between received modules comprises mapping the semantic relationship pairs between the first module and the second module and identifying corresponding compliance requirements found in both the first module and the second module.

14. The artificially intelligent system of claim 12, wherein mapping the semantic relationship pairs between received modules comprises mapping the semantic relationship pairs between the first module and the second module to use as a training set for natural language processing.

15. The artificially intelligent system of claim 13, further comprising instructions for applying trained natural language processing to at least one newly issued law to generate proposed or model regulatory text for the law.

* * * * *